US011916450B2

(12) United States Patent
Sheth et al.

(10) Patent No.: US 11,916,450 B2
(45) Date of Patent: Feb. 27, 2024

(54) AXIAL FLUX SUBMERSIBLE ELECTRIC MOTOR

(71) Applicant: Halliburton Energy Services, Inc., Houston, TX (US)

(72) Inventors: Ketankumar Kantilal Sheth, Tulsa, OK (US); Donn J. Brown, Broken Arrow, OK (US); David Christopher Beck, Broken Arrow, OK (US); Robert Charles de Long, Sand Springs, OK (US); Trevor Alan Kopecky, Owasso, OK (US)

(73) Assignee: Halliburton Energy Services, Inc., Houston, TX (US)

( * ) Notice: Subject to any disclaimer, the term of this patent is extended or adjusted under 35 U.S.C. 154(b) by 190 days.

(21) Appl. No.: 17/196,223

(22) Filed: Mar. 9, 2021

(65) Prior Publication Data
US 2021/0320549 A1 Oct. 14, 2021

Related U.S. Application Data

(60) Provisional application No. 63/007,052, filed on Apr. 8, 2020.

(51) Int. Cl.
*H02K 21/24* (2006.01)
*E21B 43/12* (2006.01)
(Continued)

(52) U.S. Cl.
CPC .......... *H02K 21/24* (2013.01); *E21B 43/128* (2013.01); *F04D 13/0666* (2013.01); *H02K 1/20* (2013.01);
(Continued)

(58) Field of Classification Search
CPC ........ H02K 21/24; H02K 11/21; H02K 5/124; H02K 7/003; H02K 9/19
(Continued)

(56) References Cited

U.S. PATENT DOCUMENTS

| 1,978,986 A | 7/1932 | Coberly |
| 1,960,484 A | 5/1934 | Ekstromer |

(Continued)

FOREIGN PATENT DOCUMENTS

| CA | WO0139353 A1 * | 5/2001 |
| CA | 2530162 A1 | 12/2004 |

(Continued)

OTHER PUBLICATIONS

Filing Receipt, Specification and Drawings for U.S. Appl. No. 63/007,052, entitled "Axial Flux Submersible Electric Motor," filed Apr. 8, 2020, 65 pages.

(Continued)

*Primary Examiner* — Jose A Gonzalez Quinones
(74) *Attorney, Agent, or Firm* — Conley Rose, P.C.; Rodney B. Carroll

(57) ABSTRACT

A pump system for pumping production fluids from a wellbore or pumping well treatment fluids into a wellbore comprising: an axial flux electric motor; a seal section coupled to the axial flux motor; a pump intake coupled to the seal section; a pump coupled to the pump intake, and a fluid discharge coupled to the pump. The torque capacity axial flux motor may be modified without removing the axial flux motor from the pump.

25 Claims, 19 Drawing Sheets

(51) Int. Cl.

| | | |
|---|---|---|
| *F04D 13/06* | (2006.01) | |
| *H02K 1/20* | (2006.01) | |
| *H02K 1/2796* | (2022.01) | |
| *H02K 5/124* | (2006.01) | |
| *H02K 5/132* | (2006.01) | |
| *H02K 5/20* | (2006.01) | |
| *H02K 5/22* | (2006.01) | |
| *H02K 7/00* | (2006.01) | |
| *H02K 7/108* | (2006.01) | |
| *H02K 9/19* | (2006.01) | |
| *H02K 11/21* | (2016.01) | |
| *H02K 16/04* | (2006.01) | |
| *E21B 47/008* | (2012.01) | |
| *E21B 49/08* | (2006.01) | |

(52) U.S. Cl.
CPC ........... *H02K 1/2796* (2022.01); *H02K 5/124* (2013.01); *H02K 5/132* (2013.01); *H02K 5/203* (2021.01); *H02K 5/225* (2013.01); *H02K 7/003* (2013.01); *H02K 7/108* (2013.01); *H02K 9/19* (2013.01); *H02K 11/21* (2016.01); *E21B 47/008* (2020.05); *E21B 49/0875* (2020.05); *H02K 16/04* (2013.01); *H02K 2205/03* (2013.01); *H02K 2213/12* (2013.01)

(58) Field of Classification Search
USPC ...... 310/66, 87, 101, 112, 114, 154.33, 267, 310/268
See application file for complete search history.

(56) References Cited

U.S. PATENT DOCUMENTS

| | | | |
|---|---|---|---|
| 2,098,958 A | | 11/1937 | Ekstromer |
| 3,407,320 A | * | 10/1968 | McLean ................ H02K 5/132 310/180 |
| 3,952,218 A | | 4/1976 | Deters |
| 4,053,196 A | | 10/1977 | Dunaway |
| 4,409,504 A | | 10/1983 | Wilson et al. |
| 4,549,105 A | | 10/1985 | Yamamoto et al. |
| 5,068,554 A | | 11/1991 | Mohn |
| 5,821,660 A | | 10/1998 | Anderson |
| 5,982,074 A | | 11/1999 | Smith et al. |
| 6,388,353 B1 | | 5/2002 | Liu et al. |
| 6,700,252 B2 | | 3/2004 | Fleshman et al. |
| 6,794,788 B1 | | 9/2004 | Smith et al. |
| 6,811,382 B2 | | 11/2004 | Buchanan et al. |
| 8,330,308 B2 | | 12/2012 | Denny |
| 8,353,336 B2 | | 1/2013 | Neuhaus et al. |
| 8,408,312 B2 | | 4/2013 | Fielder et al. |
| 8,443,900 B2 | | 5/2013 | Fielder et al. |
| 8,476,854 B2 | | 7/2013 | Blocher et al. |
| 8,590,609 B2 | | 11/2013 | Smithson et al. |
| 8,692,408 B2 | | 4/2014 | Zhang et al. |
| 8,696,327 B2 | | 4/2014 | Forsberg |
| 8,866,425 B2 | | 10/2014 | Lund et al. |
| 8,899,054 B2 | | 12/2014 | Jankowski et al. |
| 9,057,256 B2 | | 6/2015 | Ige et al. |
| 9,394,917 B2 | | 7/2016 | Jankowski et al. |
| 9,601,925 B2 | | 3/2017 | Stinessen et al. |
| 9,638,020 B2 | | 5/2017 | Hay |
| 9,797,402 B2 | | 10/2017 | Jankowski et al. |
| 9,899,838 B2 | | 2/2018 | Elasser et al. |
| 10,100,835 B2 | | 10/2018 | Torrey et al. |
| 10,110,013 B2 | | 10/2018 | Dong et al. |
| 10,122,167 B2 | | 11/2018 | Boe |
| 10,135,310 B2 | | 11/2018 | Schuler et al. |
| 10,141,803 B2 | | 11/2018 | Schuler et al. |
| 10,177,620 B2 | | 1/2019 | Smith et al. |
| 10,605,057 B2 | | 3/2020 | Huynh et al. |
| 10,844,875 B2 | | 11/2020 | Zia et al. |
| 2002/0066568 A1 | | 6/2002 | Buchanan et al. |
| 2002/0079763 A1 | * | 6/2002 | Fleshman ............. H02K 5/132 310/112 |
| 2004/0136849 A1 | | 7/2004 | Du et al. |
| 2007/0096571 A1 | | 5/2007 | Yuratich |
| 2007/0273225 A1 | | 11/2007 | Head |
| 2009/0127956 A1 | | 5/2009 | Ozaki et al. |
| 2011/0309726 A1 | * | 12/2011 | Carpenter ............. H02K 21/24 310/75 R |
| 2013/0038144 A1 | | 2/2013 | McAleese et al. |
| 2013/0192824 A1 | | 8/2013 | Fielder et al. |
| 2013/0272898 A1 | | 10/2013 | Toh et al. |
| 2014/0042842 A1 | | 2/2014 | Tokoi et al. |
| 2015/0034294 A1 | * | 2/2015 | Miles ..................... E21B 47/13 166/66.5 |
| 2015/0064032 A1 | | 3/2015 | Sadana et al. |
| 2015/0139822 A1 | | 5/2015 | Jankowski et al. |
| 2016/0099663 A1 | | 4/2016 | Petrowsky et al. |
| 2016/0251956 A1 | | 9/2016 | Parra et al. |
| 2016/0380560 A1 | | 12/2016 | Torrey |
| 2017/0264170 A1 | | 9/2017 | Oyarzun et al. |
| 2018/0128268 A1 | | 5/2018 | Bornemann et al. |
| 2018/0142541 A1 | | 5/2018 | Yuratich |
| 2018/0145574 A1 | | 5/2018 | McCaw |
| 2019/0120249 A1 | | 4/2019 | Judge et al. |
| 2019/0123609 A1 | * | 4/2019 | Wilcox ................... F16C 17/02 |
| 2019/0145428 A1 | | 5/2019 | Judge et al. |
| 2019/0253000 A1 | | 8/2019 | Kratchman et al. |
| 2019/0296659 A1 | | 9/2019 | Reitz et al. |

FOREIGN PATENT DOCUMENTS

| | | | | |
|---|---|---|---|---|
| CA | 2590566 A1 | | 1/2008 | |
| CN | 201409032 Y | | 2/2010 | |
| CN | 201813291 U | * | 4/2011 | |
| CN | 203942424 U | * | 11/2014 | |
| CN | 205283276 U | | 6/2016 | |
| CN | 110154786 A | * | 8/2019 | |
| DE | 3103508 A1 | | 10/1982 | |
| DE | 102005003476 A1 | | 7/2006 | |
| DE | 102008035609 A1 | * | 2/2010 | ............. H02K 16/00 |
| EP | 0858145 A2 | | 8/1998 | |
| GB | 1060570 A | | 3/1967 | |
| JP | S60147965 U | | 10/1985 | |
| JP | 2003120571 A | | 4/2003 | |
| JP | 2017093013 A | | 5/2017 | |
| WO | WO-0139353 A1 | * | 5/2001 | ........... H02K 5/1285 |
| WO | 2015178887 A1 | | 11/2015 | |
| WO | 2016049244 A1 | | 3/2016 | |
| WO | 2016174448 A1 | | 11/2016 | |
| WO | 2017077813 A1 | | 11/2017 | |
| WO | WO-2019022880 A1 | * | 1/2019 | ........... E21B 43/128 |
| WO | 20210414 A1 | | 3/2021 | |

OTHER PUBLICATIONS

Zhang, Zhuoran et al., "Feasibility of a New Iron-less-stator Axial Flux Permanent Magnet Machine for Aircraft Electric Propulsion Application," CES Transactions on Electrical Machines and Systems, Mar. 2019, pp. 30-38, vol. 3, No. 1, IEEE.

Syed, Qurban Ali Shah et al., "Magnetization Characteristics and Loss Measurements of the Axial Flux Permanent Magnet Motor's Stator," 2019 IEEE International Electric Machines & Drives Conference, May 2019, pp. 1061-1066, IEEE.

Filing Receipt, Specification and Drawings for U.S. Appl. No. 17/196,230, entitled "Axial Flux Submersible Electric Motor," filed Mar. 9, 2021, 70 pages.

Filing Receipt, Specification and Drawings for U.S. Appl. No. 17/196,234, entitled "Axial Flux Submersible Electric Motor," filed Mar. 9, 2021, 70 pages.

Filing Receipt, Specification and Drawings for U.S. Appl. No. 17/196,235, entitled "Axial Flux Submersible Electric Motor," filed Mar. 9, 2021, 69 pages.

Filing Receipt, Specification and Drawings for U.S. Appl. No. 17/196,239, entitled "Axial Flux Submersible Electric Motor," filed Mar. 9, 2021, 77 pages.

(56) References Cited

OTHER PUBLICATIONS

Nasiri-Gheidari, Zahra et al., "A Survey on Axial Flux Induction Motors," Electrical Review, Feb. 2012, ISSN 0033-2097, pp. 300-305, University of Tehran.
Aydin, M. et al., "Axial Flux Permanent Magnet Disc Machines: A Review," Wisconsin Electric Machines & Power Electronics Consortium, Oct. 2004, 12 pages, University of Wisconsin—Madison.
Moreels, Daan et al., "High Efficiency Axial Flux Machines: Why Axial Flux Motor and Generator Technology Will Drive the Next Generation of Electric Machines," Apr. 2018, White Paper V1.5, 26 pages, Magnax.
Office Action dated Sep. 1, 2022 (30 pages), U.S. Appl. No. 17/196,235, filed Mar. 9, 2021.
Foreign Communication from Related Application—International Search Report and Written Opinion of the International Searching Authority, International Application No. PCT/US2021/021929, dated Jul. 8, 2021, 10 pages.
Foreign Communication from Related Application—International Search Report and Written Opinion of the International Searching Authority, International Application No. PCT/US2021/021931, dated Jul. 9, 2021, 12 pages.
Foreign Communication from Related Application—International Search Report and Written Opinion of the International Searching Authority, International Application No. PCT/US2021/021932, dated Jul. 9, 2021, 13 pages.
Foreign Communication from Related Application—International Search Report and Written Opinion of the International Searching Authority, International Application No. PCT/US2021/021933, dated Jul. 1, 2021, 10 pages.
Foreign Communication from Related Application—International Search Report and Written Opinion of the International Searching Authority, International Application No. PCT/US2021/021934, dated Jul. 1, 2021, 9 pages.
Office Action dated Jan. 20, 2023 (38 pages), U.S. Appl. No. 17/196,234, filed Mar. 9, 2021.
First Office Action dated Jun. 30, 2023 (52 pages), U.S. Appl. No. 17/196,230, filed Mar. 9, 2021.
Final Office Action dated Jul. 7, 2023 (33 pages), U.S. Appl. No. 17/196,234, filed Mar. 9, 2021.
Final Office Action dated Apr. 18, 2023 (30 pages), U.S. Appl. No. 17/196,235, filed Mar. 9, 2021.
Kahourzade, Solmaz et al., "A Comprehensive Review of Axial-Flux Permanent-Magnet Machines," Canadian Journal of Electrical and Computer Engineering, 2014, pp. 19-33, vol. 37, No. 1, IEEE.
Foreign Communication from Related Application—European Search Report, European Application No. 21785508.9, dated Aug. 16, 2023, 13 pages.
Foreign Communication from Related Application—European Search Report, European Application No. 21784953.8, dated Aug. 10, 2023, 17 pages.
Foreign Communication from Related Application—European Search Report, European Application No. 21784039.6, dated Aug. 28, 2023, 16 pages.
Foreign Communication from Related Application—European Search Report, European Application No. 21785444.7, dated Aug. 14, 2023, 13 pages.
Foreign Communication from Related Application—European Search Report, European Application No. 21784954.6, dated Aug. 8, 2023, 9 pages.
Office Action dated Nov. 21, 2023 (29 pages), U.S. Appl. No. 17/196,230, filed Mar. 9, 2021.

* cited by examiner

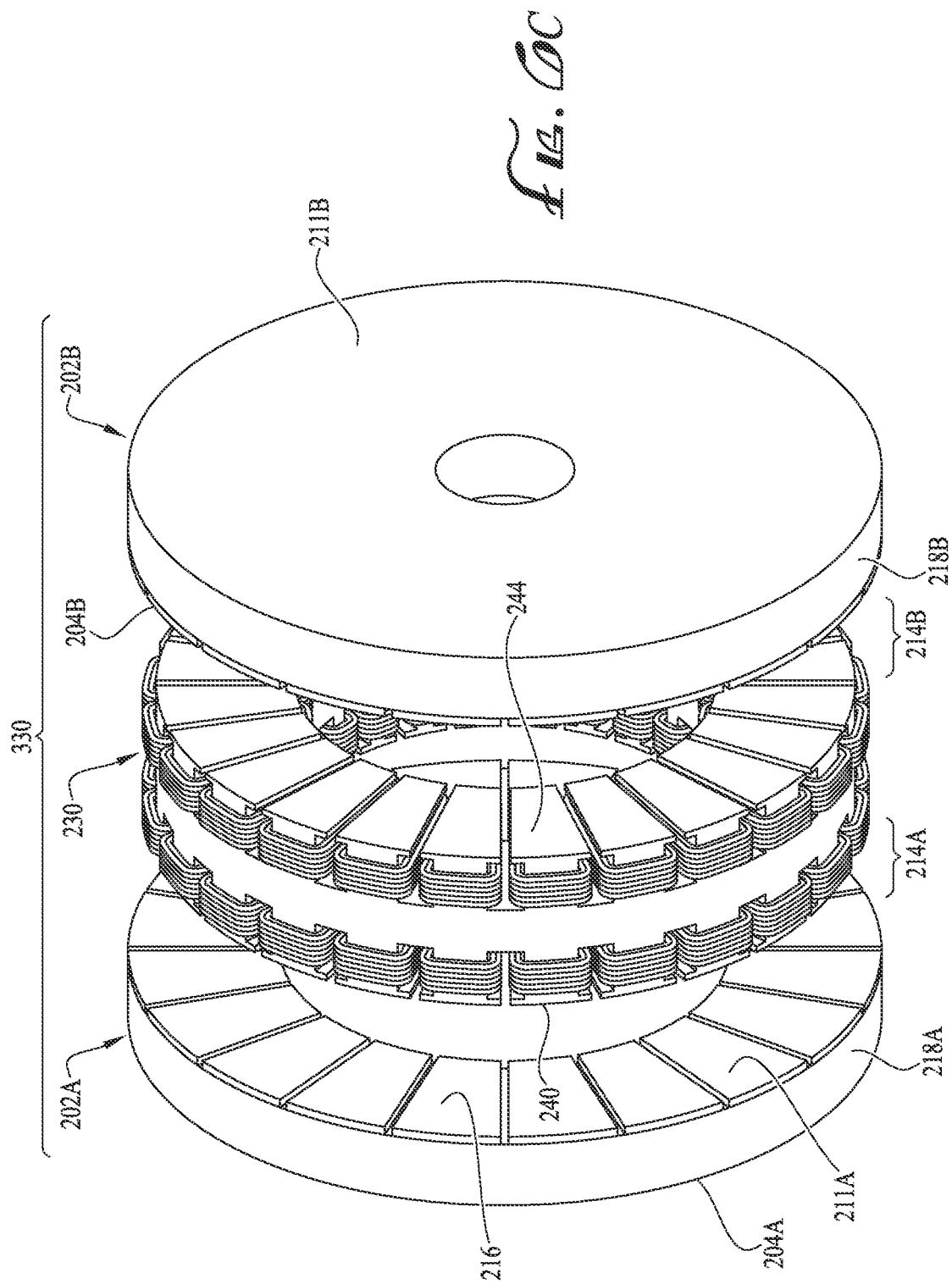

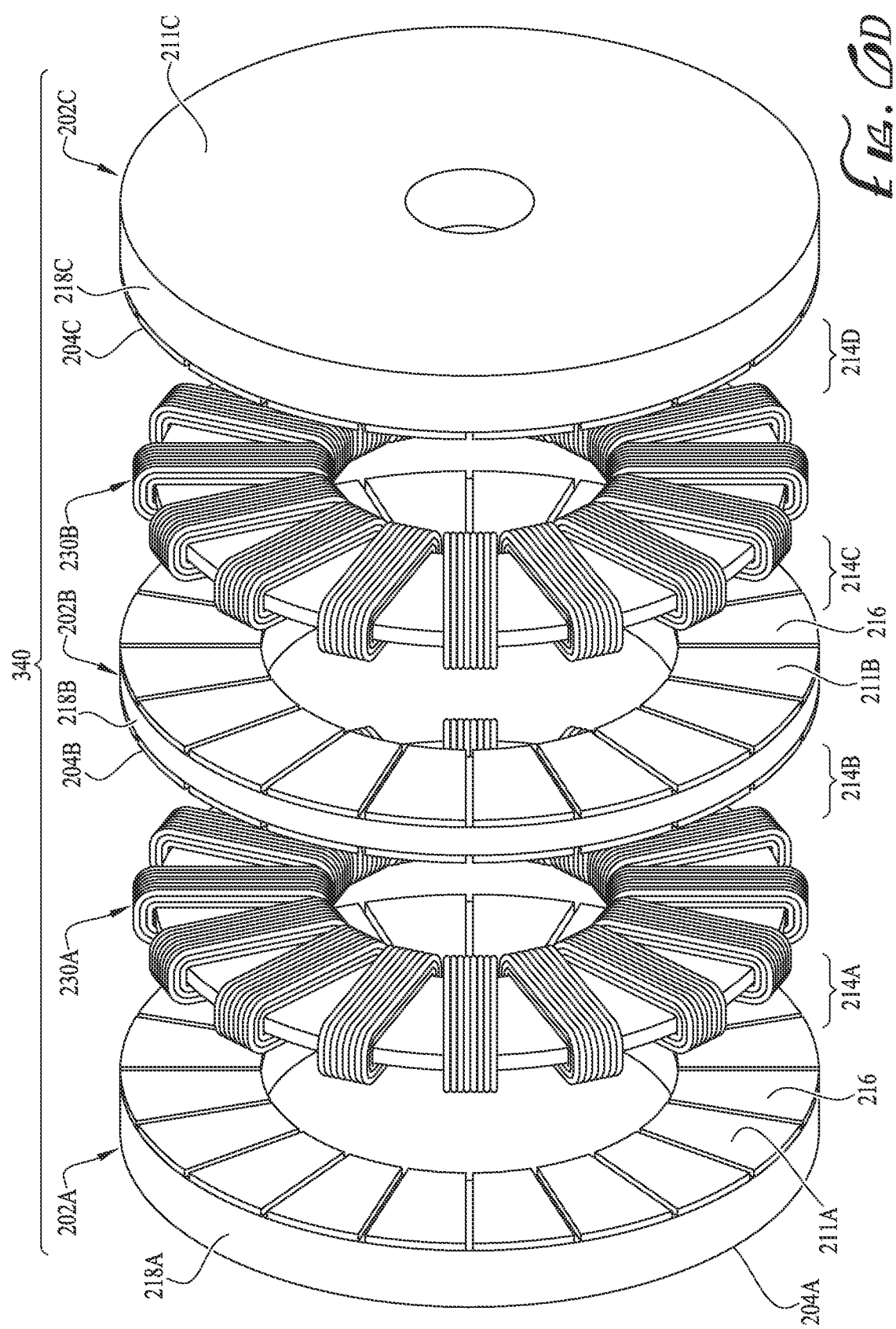

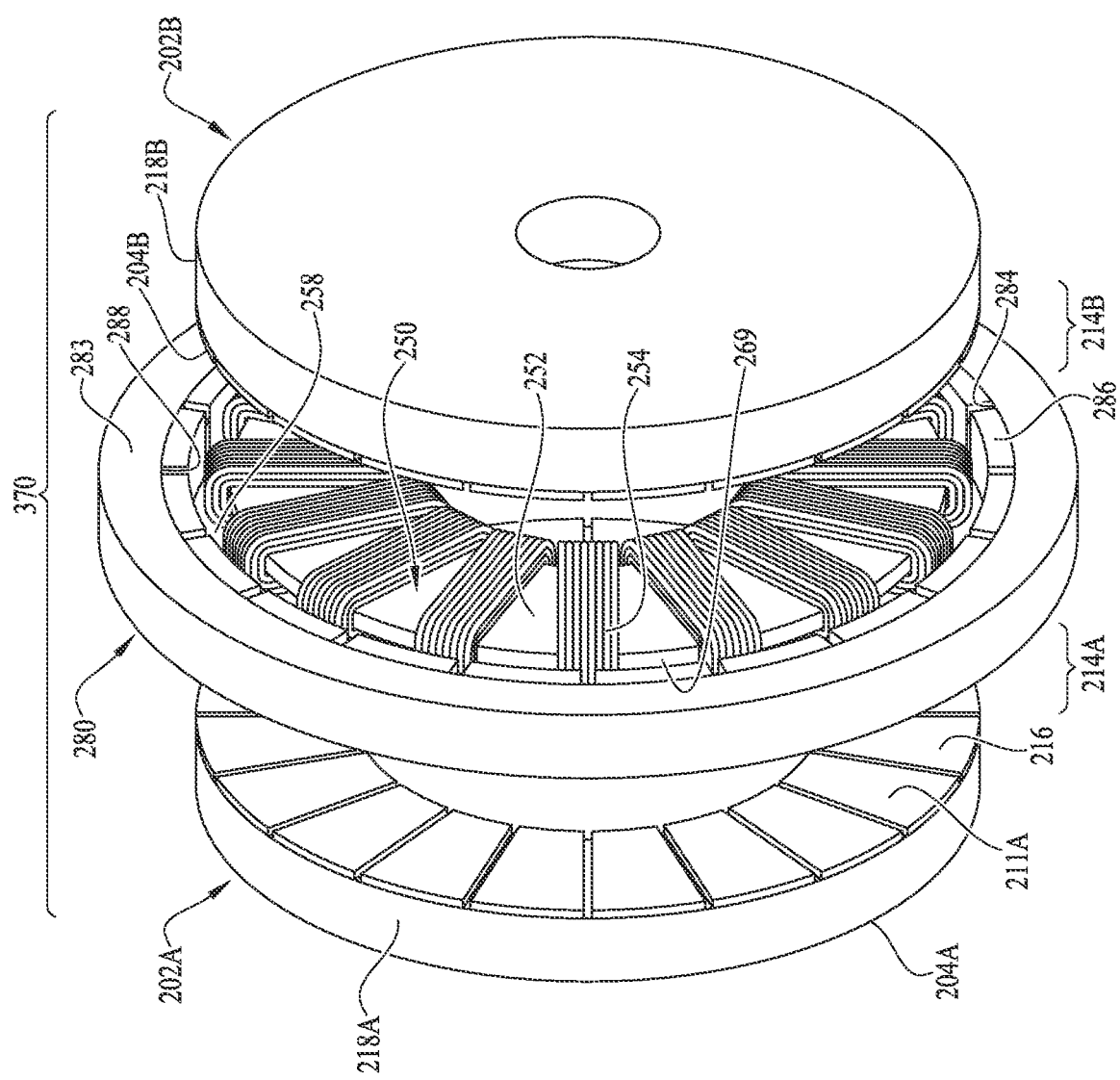

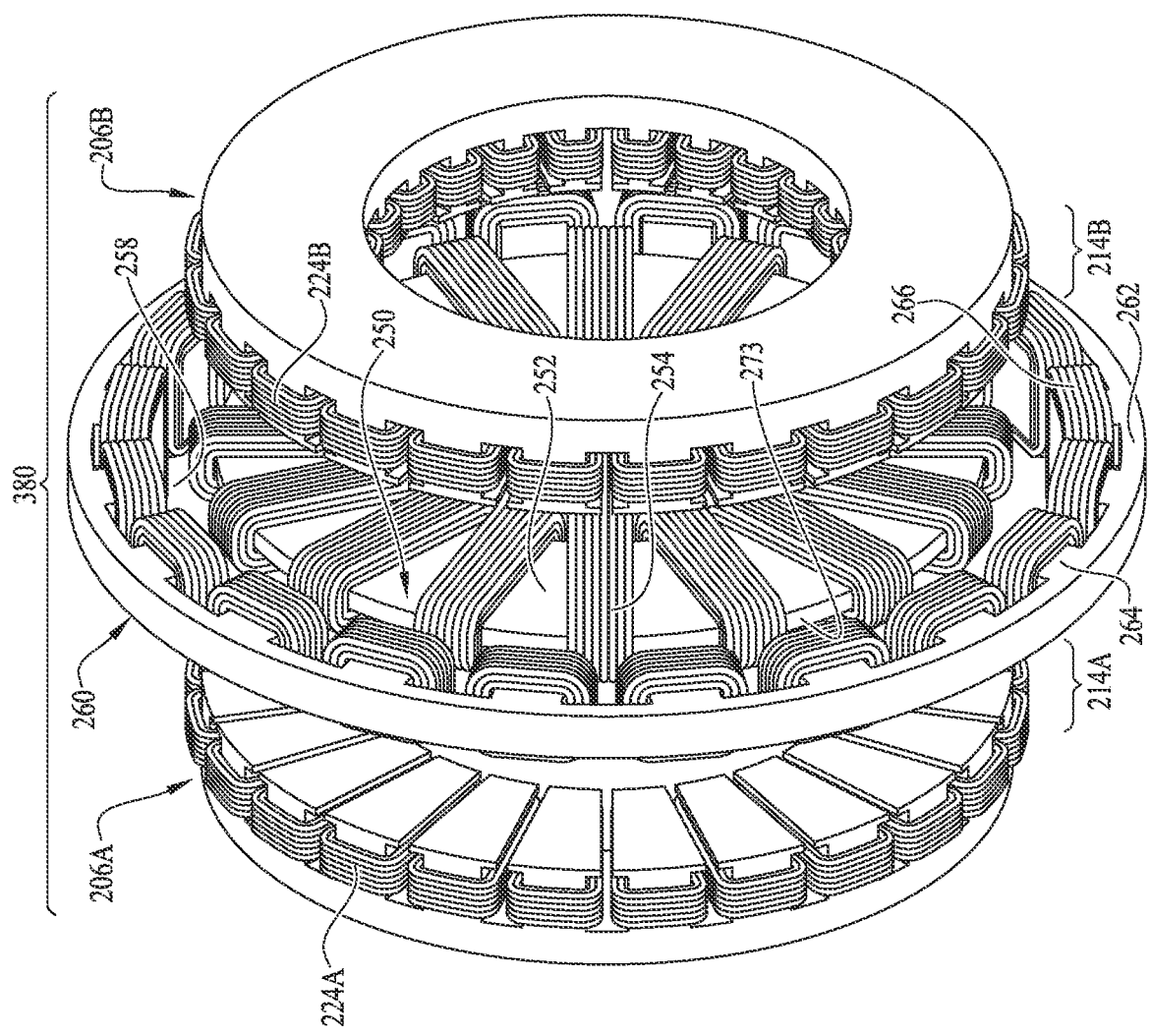

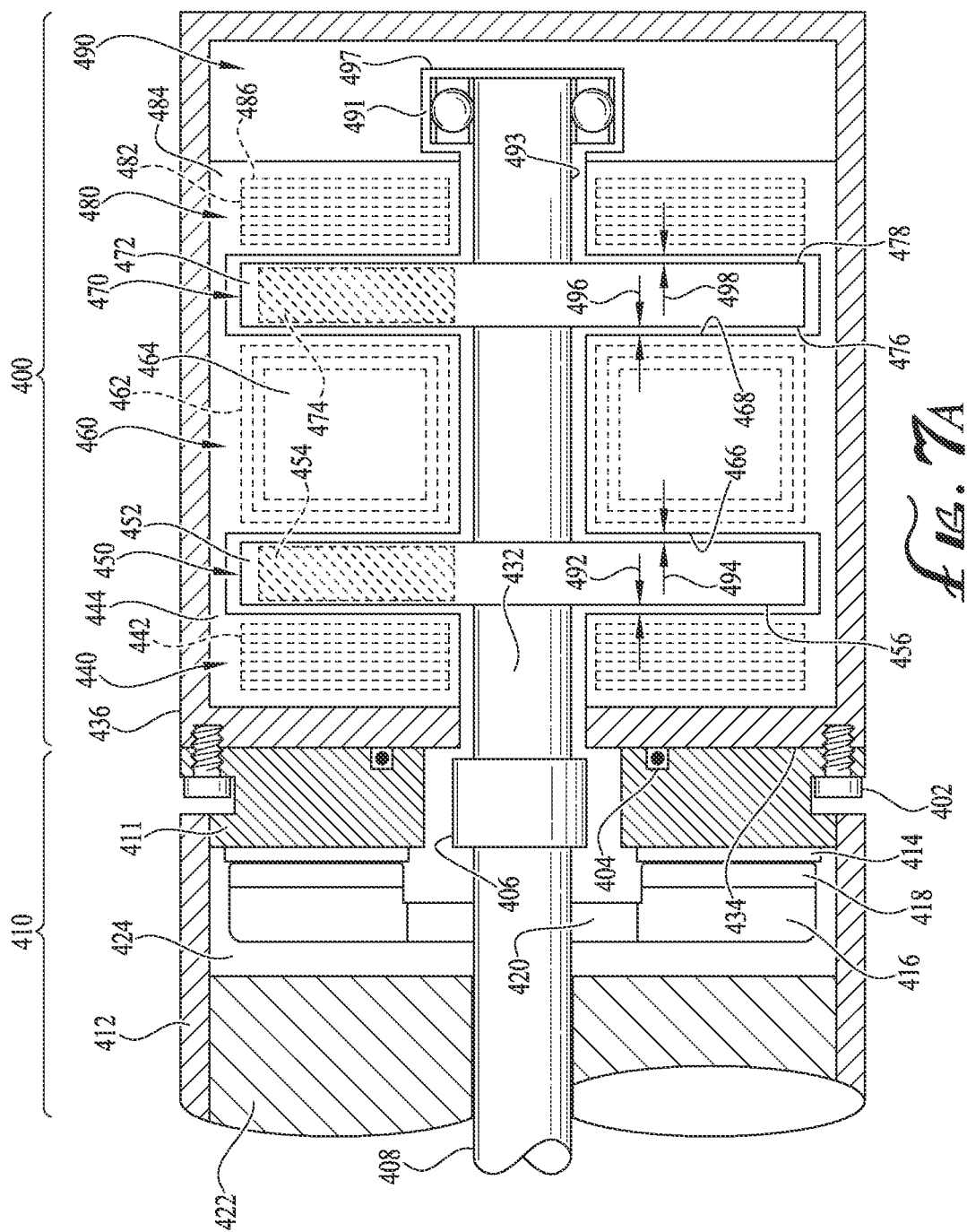

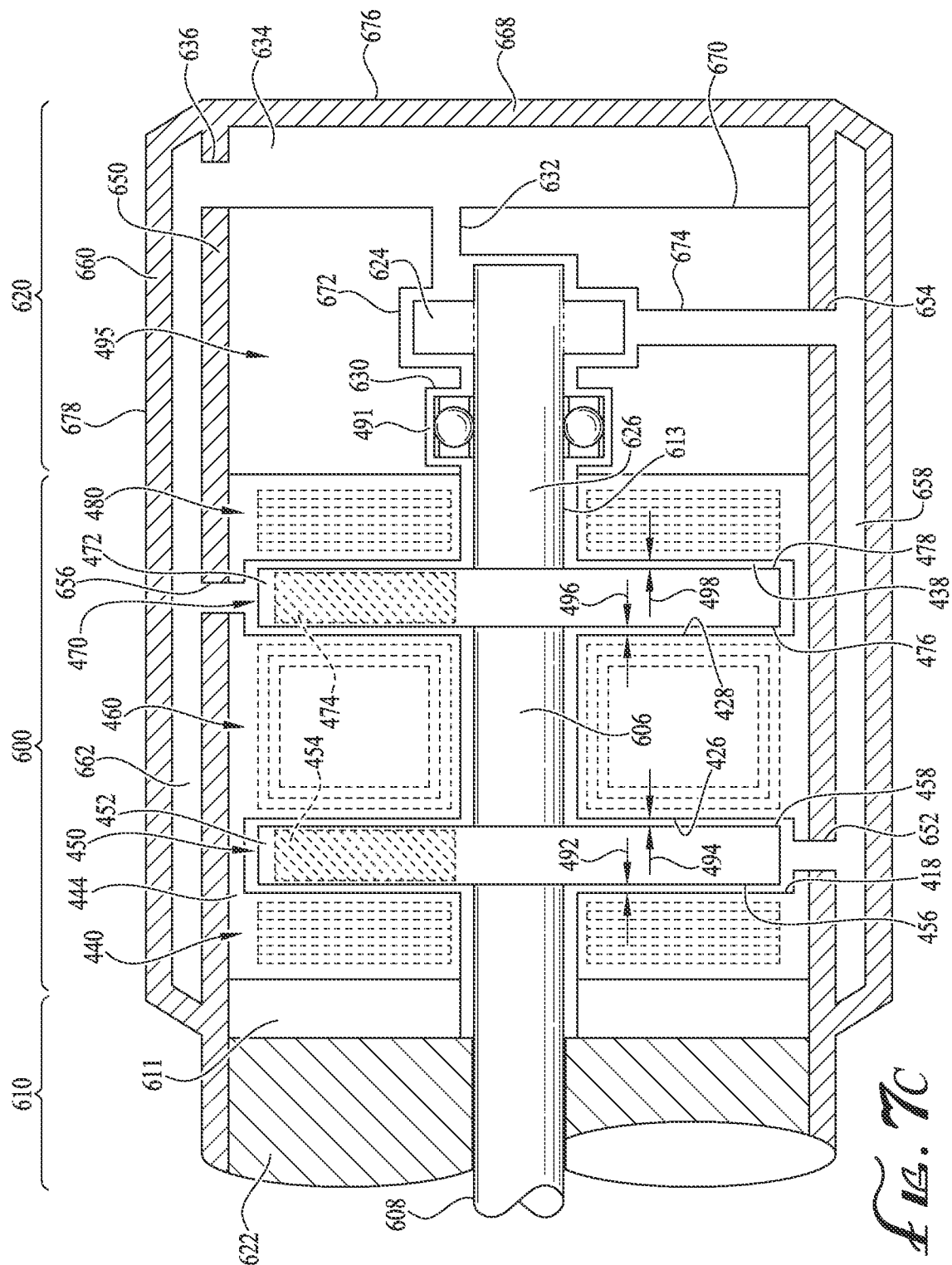

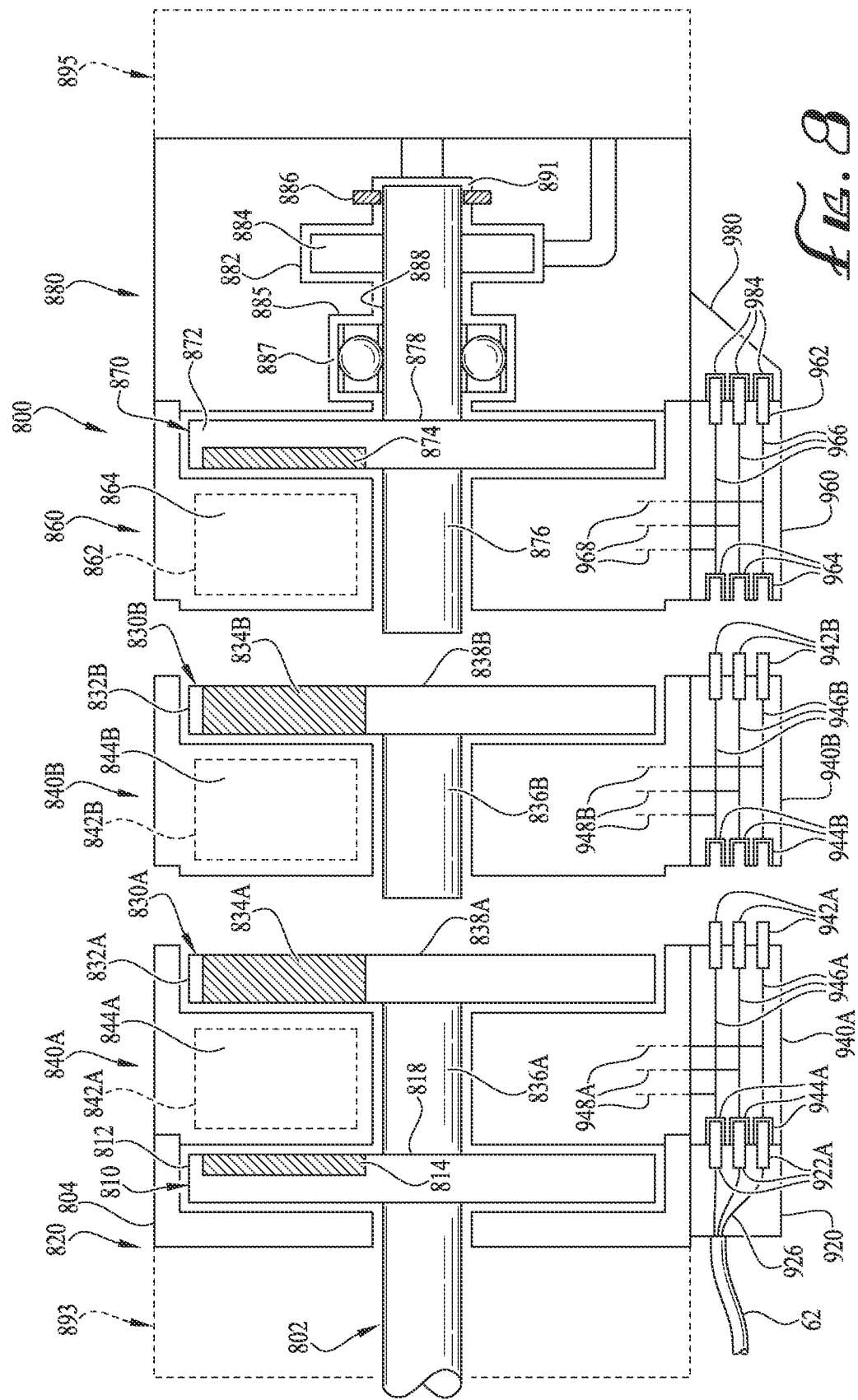

AXIAL FLUX SUBMERSIBLE ELECTRIC MOTOR

CROSS-REFERENCE TO RELATED APPLICATIONS

This application claims priority under 35 U.S.C. § 119(e) to U.S. Provisional Patent Application No. 63/007,052 filed on Apr. 8, 2020 and entitled "Axial Flux Submersible Electric Motor," the disclosure of which is hereby incorporated herein by reference in its entirety.

STATEMENT REGARDING FEDERALLY SPONSORED RESEARCH OR DEVELOPMENT

Not applicable.

REFERENCE TO A MICROFICHE APPENDIX

Not applicable.

BACKGROUND

The present application is related to pumps used to lift fluids from the ground or inject fluids into the ground and, more specifically, the electric motors used to power the pumps.

Natural resources can be recovered from subterranean formations for example by drilling a wellbore to access the subterranean formations. Often the natural resources initially flow to surface via the wellbore due to formation pressure in the subterranean formations. As the production of natural resources continues, the formation pressure decreases until a method of artificial lift may be required. An electric submersible pump placed in the wellbore is one artificial lift method utilized to lift formation fluids such as hydrocarbons from the wellbore to surface.

Electric submersible pumps rely on electricity to power the electric motor attached to the pump section. Typically these motors have relied on a traditional and less efficient motor construction. Ongoing interest exists in utilizing electric motors that conserve electricity by improving the efficiency of the motors.

BRIEF DESCRIPTION OF THE DRAWINGS

For a more complete understanding of the present disclosure, reference is now made to the following brief description, taken in connection with the accompanying drawings and detailed description, wherein like reference numerals represent like parts.

FIG. 8 is a sectional view showing the rotors and stators of the axial gap type motor according to an embodiment of the present invention.

DETAILED DESCRIPTION

It should be understood at the outset that although illustrative implementations of one or more embodiments are illustrated below, the disclosed systems and methods may be implemented using any number of techniques, whether currently known or not yet in existence. The disclosure should in no way be limited to the illustrative implementations, drawings, and techniques illustrated below, but may be modified within the scope of the appended claims along with their full scope of equivalents.

Conventional electric submersible pump manufacturers have long utilized a standard radial flux motor to power the pump. The standard radial flux motor utilizes electromagnetic coils for the stator wound axially from the head to the base. These head to base wound coils generate the magnetic flux that turn the rotor. The rotor is inside the stator so that the magnetic flux is oriented radially away from the central axis. The long head to base wound coils of the radial stator result in some non-active sections, called overhang, away from the rotor that do not produce usable magnetic flux to the rotor and reduce the efficiency by increasing the resistive heat generated by the electric current. The radial flux electric motors also produce a smaller amount of torque because the magnetic flux is inside the stator between the rotor and stator.

Compared to a similar size radial flux electric motor, axial flux electric motors develop more torque with a higher efficiency while using less material. In an axial flux motor, the rotor and stator are disk shapes that are stacked side-by-side with a common axis. The rotor and stators alternate from rotor to stator with the stator held static within the housing. The rotor turns within the housing with the magnetic flux traveling axially between rotor and stator. The permanent magnet axial flux electric motor has a disk shaped stator with small windings that align with permanent magnets on the rotor. The small electromagnetic windings are smaller than the long axially wound stators of the radial flux motors and have little to no non-active sections and generate less heat.

Disclosed herein is a pumping system for use with oil well operations utilizing an axial flux motor powered by an electric power source. The pumping system may be used to treat a well or produce a well. The pumping system uses a controller with an electric power source to power an axial flux motor to pump fluids into or out of an oil well.

Figure 1:
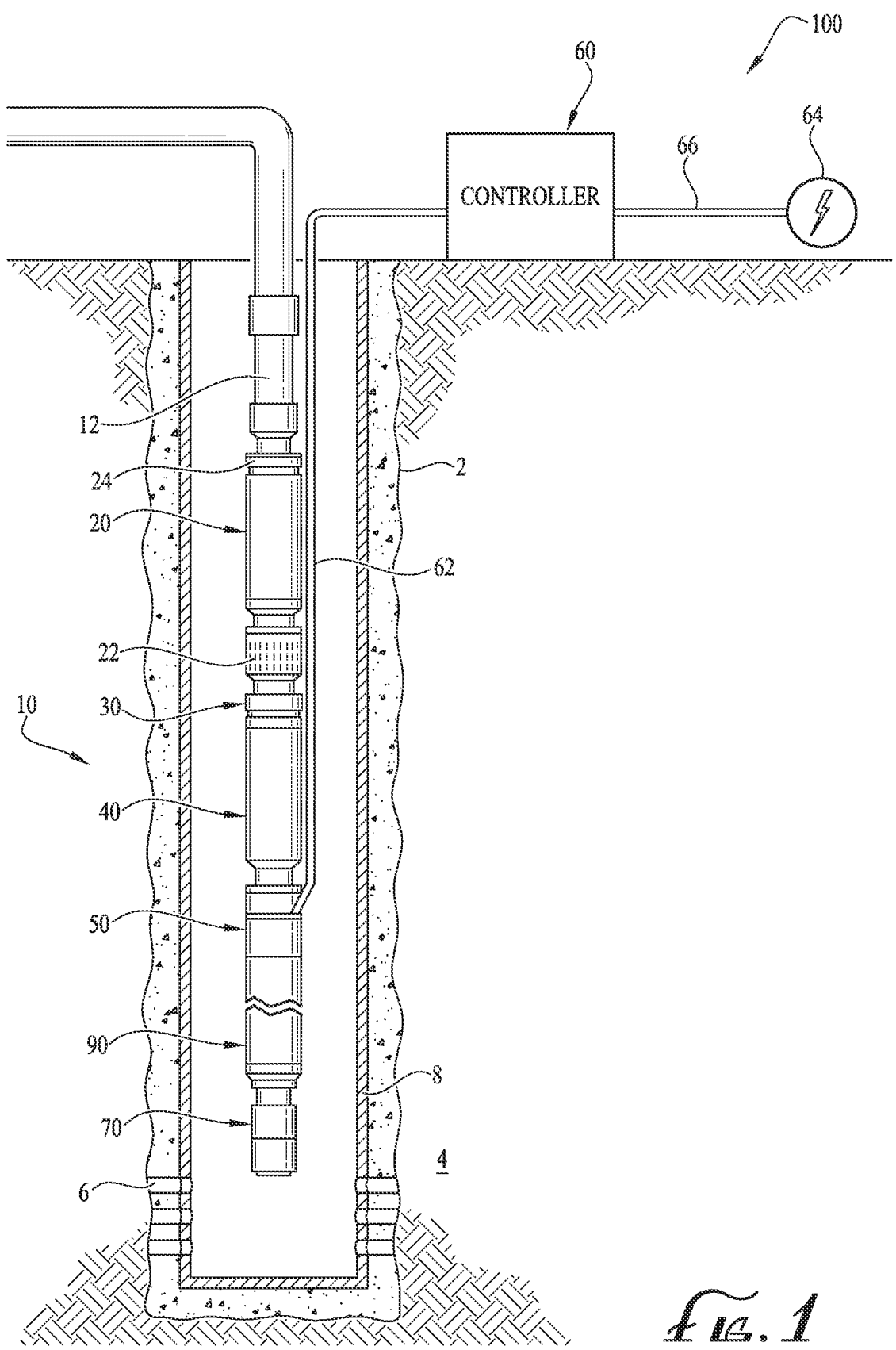
FIG. 1 is a cut-away illustration of an embodiment of a pump system.

Turning now to FIG. 1, illustrated is an embodiment of a pump system 100 that may be utilized as a submersible pump, e.g., an electrical submersible pump (ESP), to lift production fluids from the well to the surface. The well 10 may have a wellbore 2 drilled through the earth to a hydrocarbon bearing formation 4. Perforations 6 in the casing 8 enable the fluid in the hydrocarbon bearing formation 4 to enter the casing 8. Production tubing 12 extends from the surface to support pump system 100 at a depth proximate the perforations 6.

The pump system 100 may include a pump assembly 20, transmission assembly 30, seal section 40, axial flux motor 50, controller 60, sensor array 70, and heat exchanger system 90, each of which may be coupled together using suitable connectors such as bolted flange connectors, threaded connectors, etc. An electrical power source 64 may be connected to the controller 60 by transmission cables 66. The controller 60 provides electric power through power cables 62 to the axial flux motor 50 to rotate the pump assembly 20 while monitoring the sensor array 70 for feedback on the motor condition and fluid properties at the pump intake and exit. Alternatively, the controller 60 can be located downhole, for example proximate other downhole components of the pump system 100. The pump assembly 20 has a pump intake assembly 22 and a pump discharge 24 attached to production tubing 12 to transport the production fluids to surface. In an embodiment, the axial flux motor 50 has a heat exchanger system 90 such as a circulating oil system to remove the heat generated by the axial flux motor 50.

The controller 60 may change the pump operation based on user inputs, the data provided by the sensor array 70, or both. In an embodiment, the controller 60 may comprise a variable speed drive system that monitors the feedback from the sensor array 70 and adjusts the voltage and/or current output to maintain a constant motor torque. The sensor array 70 may include a pump intake pressure sensor, a pump discharge pressure sensor, wellbore fluid property indicators (e.g. pressure, temperature, viscosity, density, fluid phase condition, and solids content), a motor temperature sensor, a motor voltage feedback, a motor torque indicator, a current monitor, and shaft rotational position indicator. The sensor array 70 may include a rotary encoder, also called a shaft encoder, located along the rotary shaft in one or more locations including the pump assembly 20, the transmission assembly 30, the seal section 40, the axial flux motor 50, or the heat exchanger system 90. The rotary encoder may provide data on the angular motion of the rotary shaft including position, speed, distance, or any combination thereof. The rotary encoder may be an absolute rotary encoder that indicates the current shaft position (e.g., an angular transducer) or an incremental encoder that provides information about the motion of the shaft, which typically is processed into information such as rotational position, speed, and angular distance. By way of example, the rotary encoder can be an electro-mechanical device that converts angular position or motion of the shaft/axle to analog or digital output signals. The controller may control operation of the axial flux motor 50 to account for varying downhole operational conditions or loads. For example, the controller 60 may provide voltage or current to one stator for pump operations that require a low amount of torque; e.g., motor or pump diagnostics. The controller 60 may provide voltage or current to two or more stators, but not all stators for pump operations to avoid damaging pump components by providing excessive torque; e.g., over-torqueing the shaft. The controller 60 may provide voltage or current to one or more assemblies of rotor(s) and stator(s) (which may also be referred to as a module of rotor(s) and stator(s)), but not all assemblies of rotor(s) and stator(s) to isolate a damaged winding in a stator; e.g., a faulted winding. The controller 60 may change the voltage or current supplied to the axial flux motor 50 based on the data supplied by one or more sensors and/or user inputs to maintain a constant torque, change the pump rate, begin operation, or to shut down.

The pump assembly 20 may be a centrifugal type pump with a rotating impeller inside of a stationary diffuser rotating at a speed so that the fluid is pressurized. The pump assembly 20 may have a single impeller or multiple impellers inside multiple diffusers to develop enough head pressure to convey the production fluid through the production tubing 12 to the surface. The pump assembly 20 may comprise any type of centrifugal pump including a single or multistage deep well turbine, radial, axial flow impeller (e.g., propeller) or mixed flow type, multi vane pump, or helicon axial type hybrid pump. The pump assembly 20 may also be a progressing cavity pump, gear pump, screw pump, double screw pump, or any other rotating pump, such pumps sized and configured to be placed in a wellbore and mechanically coupled to the axial flux motor 50.

The pump intake assembly 22 may include a gas separator, a sand trap, a fluid modulating system, or other type of intake system. The pump intake assembly 22 on the pump assembly 20 may have a gas separator to remove all or a fraction of the produced gas before the reservoir fluid enters the pump assembly 20. Likewise, the pump intake assembly 22 may include a sand trap to remove all or a fraction of sand or debris from the produced fluids. The pump intake assembly 22 may also have a check valve that permits flow in one direction (e.g., from the wellbore into the suction of the pump).

The pump discharge 24 may include a check valve that permits flow from the pump to the production tubing 12 but prevents flow from the production tubing 12 to enter the pump assembly 20. The check valve may be a flapper valve, poppet valve, ball and seat, or any other type of check valve known to those skilled in the arts. The pump discharge 24 may include a debris diverter that prevents debris from falling back into the pump discharge 24. The debris diverter may divert the tubing flow to an annular flow through a screened section then direct the flow back to the tubing.

A seal section 40 may include one or more sealing assemblies that sealingly engage a rotary shaft to isolate the wellbore fluids from the inside of the axial flux motor 50. The seal section 40 may include a thrust bearing to isolate the axial flux motor 50 from the downward reaction force from the pump assembly 20. An upper end of the seal section 40 may couple a lower end of the pump intake assembly 22, and a lower end of the seal section 40 may couple to an upper end of the axial flux motor 50.

A transmission assembly 30 (e.g., a gear box) may optionally be used to provide additional mechanical advantage (e.g., speed and/or torque adjustments) between the seal section 40 and the pump assembly 20. The transmission assembly 30 may be attached between pump intake assembly 22 and the seal section 40. The transmission assembly 30 may include one or more gears and gear trains to adapt the torque and rotational speed of the motor to the pump assembly 20.

Optionally, the axial flux motor 50 may have a heat exchanger system 90 to remove the heat generated in the axial flux motor 50 by transferring the heat to the ambient wellbore environment, for example by utilizing a heat conductive material and a radiant geometry such an extended housing or fins. In an aspect, the heat exchanger system 90 may include a dielectric coolant commonly referred to as oil. The axial flux motor 50 may have an internal pump to circulate oil through the motor assembly to cool and lubricate the axial flux motor 50. Although the term oil is used it is understood that any dielectric fluid may be used as a coolant: mineral oil, synthetic oil, castor oil, silicone oil, and any combination of oils. In an embodiment, the heat exchanger system circulates oil though the motor and radiates the heat through a housing made of corrosion resistant and heat conductive materials. The housing may be made from corrosion resistant materials such as stainless steels, nickel alloy steels, specially designed polymer, other corrosion resistant materials, or combinations of heat conductive and corrosion resistant materials. In an embodiment, the heat exchanger system 90 may circulate the oil through the axial flux motor 50 to transfer the heat through the motor housing to the ambient wellbore fluid surrounding the housing. The ambient wellbore fluid surrounding the axial flux motor 50 may be cooler than the operating temperature of the axial flux motor 50 and cool the oil before being recirculated back through the axial flux motor 50. In an embodiment, the heat exchanger system 90 may include an oil reservoir to exchange heat with the ambient wellbore fluid. The heat exchanger system 90 may include an oil pump to circulate the oil. In an embodiment, the internal oil pump may be integral to the axial flux motor 50 or powered by the axial flux motor 50. In an embodiment, there may be two or more internal oil pumps. In an aspect, the heat exchanger system 90 may comprise a refrigeration loop to cool the circulated oil, as described in more detail herein with reference to FIG. 7D. When present, an upper portion of heat exchanger system 90 may couple a lower end of the axial flux motor 50, and a lower end of the heat exchanger system 90 may couple to an upper end of the sensor array 70. If the heat exchanger system 90 is not present, a lower end of the axial flux motor 50 may couple to an upper end of the sensor array 70.

The axial flux motor 50 may be used to power the pump assembly 20. An axial flux motor may use permanent magnets in the rotor to rotate the rotor with rotating magnetic fields generated by the stator. This rotating magnetic field repels and attracts the magnetic force produced by the permanent magnets in the rotor to cause rotation of the rotor and the attached rotary shaft. The rotor supplies the torque and rotation of the rotor and attached rotary shaft. An axial flux motor 50 includes a rotor and stator with planar faces that are disk shape with an axis of rotation perpendicular to the planar face and parallel to a rotational shaft. The axial flux motor 50 may have a single rotor and stator, a single rotor with two stators, two rotors with a single stator, or multiple rotor and stator configurations.

Figure 2:
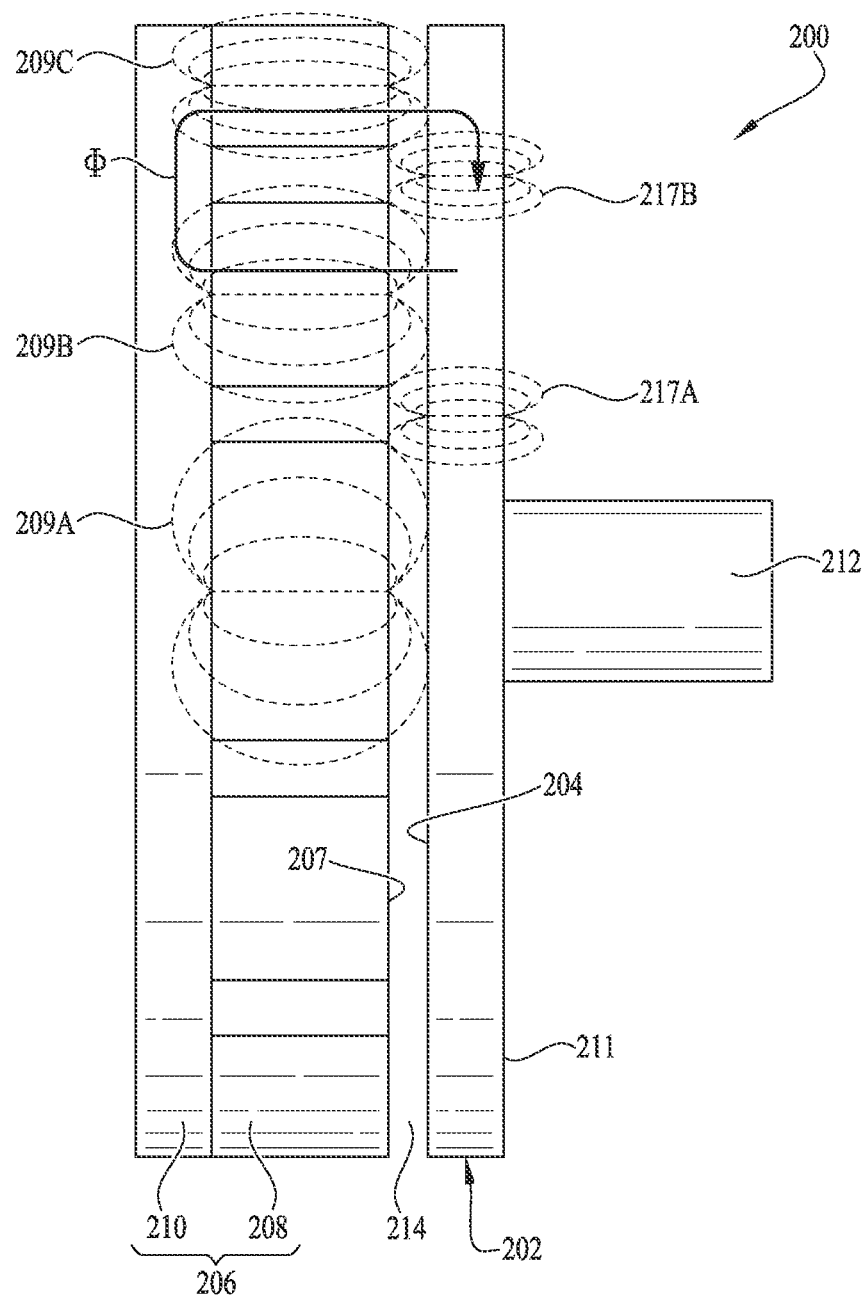
FIG. 2 is a side view drawing showing the magnetic flux flow from an embodiment of an axial gap motor.
Figure 3:
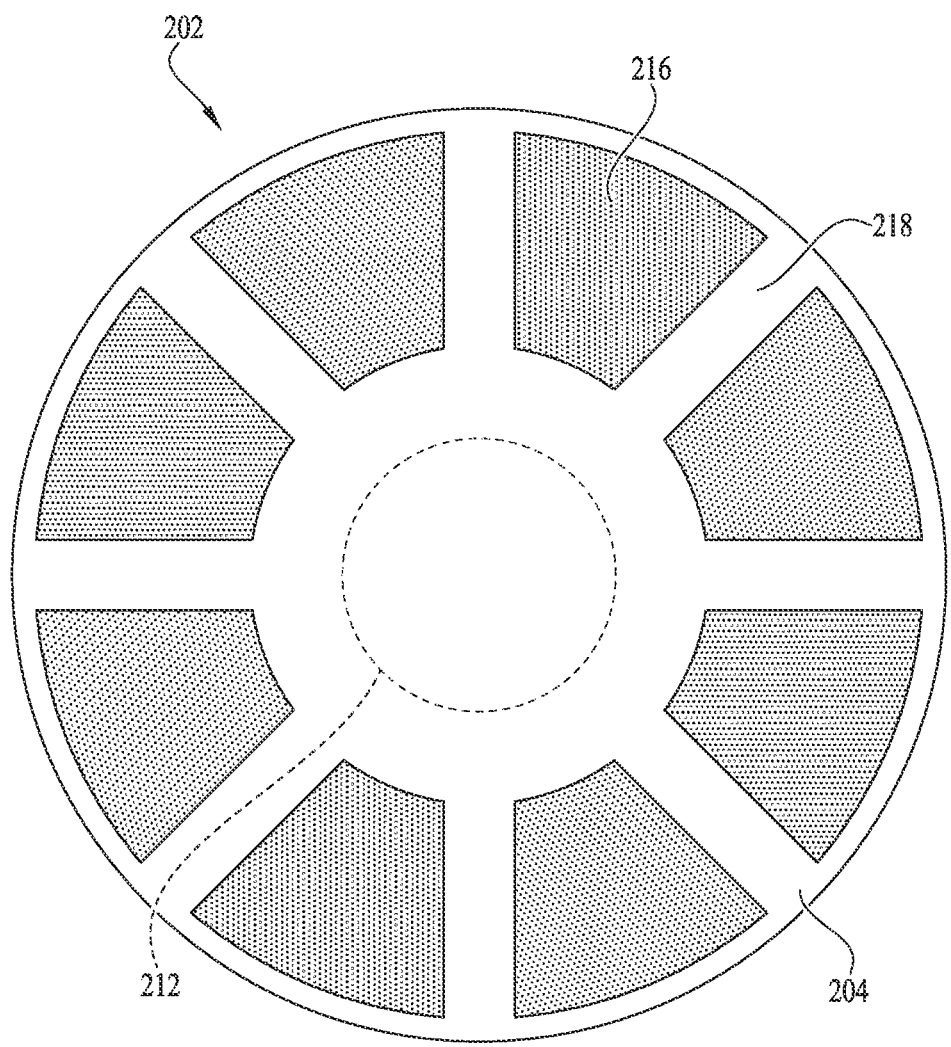
FIG. 3 is a perspective view showing a rotor of an axial gap type motor according to an embodiment of the present invention.
Figure 4:
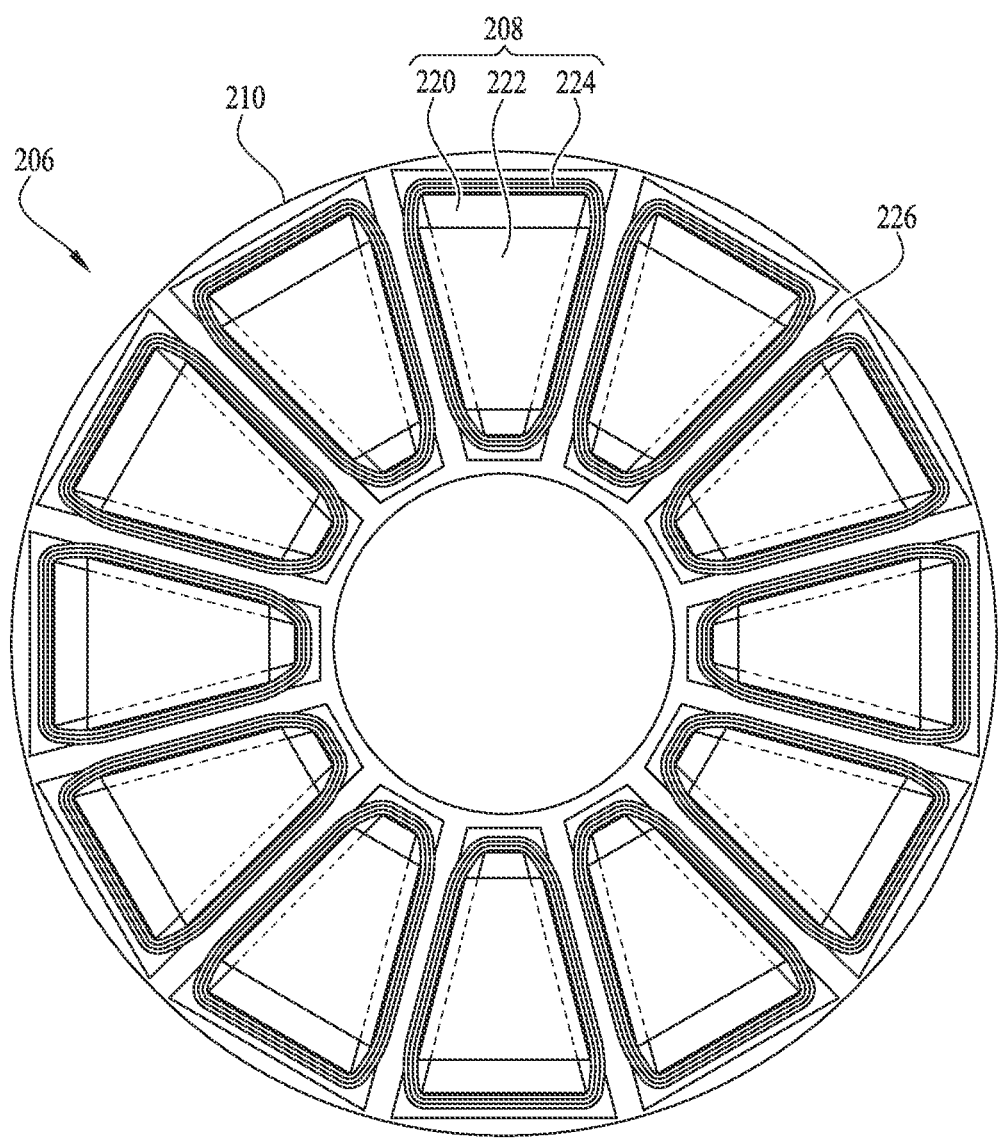
FIG. 4 is a perspective view showing a stator of an axial gap type motor according to an embodiment of the present invention.

Referring now to FIG. 2-4, an embodiment of axial flux motor 200 may have a single rotor 202 and a single stator 206. The rotor 202 and stator 206 may be mounted in a housing (e.g., sized and configured for placement in a wellbore) with the rotor front surface 204 facing the stator front surface 207 separated by axial gap 214. The rotor 202 has a rotary shaft 212 perpendicular to the rotor front surface 204. Rotor 202, as detailed in FIG. 3, may have a plurality of permanent magnets 216 angularly distributed about the rotor disk 218. The stator 206, shown in FIG. 4, has a plurality of stator windings 208 mounted on stator core 210. The position of the stator windings 208 across the axial gap 214 to the rotor front surface 204 provides a path for the axial flux Φ to generate torque. As shown in FIG. 2, the axial flux Φ is substantially parallel to a central axis of the rotary shaft 212. An axial direction can be defined as parallel to a central axis of rotary shaft 212, a radial direction can be defined as perpendicular to the central axis of rotary shaft 212 (e.g., extending from central axis of rotary shaft 212 to the circumference of the rotor 202), and an angular direction, distribution, position, or the like can be measured in degrees (e.g., 90, 180, 270, etc.) of a 360 degree circle perpendicular to the central axis of rotary shaft 212.

The rotor 202, shown in FIG. 3, may have a plurality of permanent magnets 216 mounted onto the surface of a rotor disk 218 or permanent magnets 216 mounted or fixed into the rotor disk 218. The magnets may be made of neodymium-iron-boron, samarium-cobalt, Alnico, strontium ferrite, or other permanent magnet materials. The permanent magnets 216 may be arranged radially and spaced angularly to account for the radial and angular position of the stator windings 208. The permanent magnets 216 may be wedge-shaped or any other shape to take advantage of the shape of the magnetic field of the stator 206. The polarity of the permanent magnets 216 may be varied based on the angular position on the rotor disk 218. The rotary shaft 212 may be constructed of a high strength non-magnetic alloy such as titanium, stainless steel, or nickel alloys (e.g., Inconel, Incoloy, Hastlelloy, or Monel).

The stator 206, shown in FIG. 4, may have a plurality of stator windings 208 angularly spaced on a stator core 210 separated by gap 226. Each stator winding 208 may have an electromagnet coil 224 wound about a stator winding core 222 on a coil insulator 220. The electromagnet coil 224 may be composed of a copper conductor with high temperature insulator materials for high temperature environments. High temperature polymeric insulation made from inorganic polymer materials may have such a temperature ranging from about 150 C to about 300 C, alternatively a ceramic coating or liner insulation may have such a temperature ranging from about 300 C to about 500 C. In various embodiments, the number of stator windings 208 does not equal the number of permanent magnets 216. In an embodiment, the stator 206 may have two more stator windings 208 than the rotor has permanent magnets 216. In an embodiment, the stator 206 may have four more stator windings 208 than the rotor has permanent magnets 216. The stator 206 may have any number of stator windings 208 compared to the number of permanent magnets 216 without departing from the spirit or scope of the present disclosure, including without limitation 2, 3, 4, 5, 6, 7, 8, 9, 10, 11, 12, or more number of stator windings in excess of the number of permanent magnets 216. In an embodiment, the stator 206 may have two less stator windings 208 than the rotor has permanent magnets 216. In an embodiment, the stator 206 may have four less stator windings 208 than the rotor has permanent magnets 216. The stator 206 may have any number of stator windings 208 compared to the number of permanent magnets 216 without departing from the spirit or scope of the present disclosure, including without limitation 2, 3, 4, 5, 6, 7, 8, 9, 10, 11, 12, or more number of stator windings less than the number of permanent magnets 216.

Referring to FIG. 2, the path for the magnetic flux Φ to generate torque within axial flux motor 200 is illustrated. This magnetic flux Φ is emitted from the stator winding 208 on stator 206 and influences the permanent magnet 216 magnetic field on rotor 202 across the axial gap 214. The magnetic flux Φ passes from the stator winding 208 crosses across the axial gap 214 to the rotor front surface 204, (axial being defined as the direction parallel to the axis of the rotary shaft) and thus is referred to as "axial flux" with reference to the axial flux motor utilizing same. The stator windings 208 produce a magnetic field 209A-C when an electric current is applied to the electromagnet coil 224. The magnetic field 209A-C can provide alternating magnetic poles spaced a radial distance apart that is perpendicular to the central axis of rotary shaft 212. The magnetic fields 217A-B of the permanent magnets 216 are alternately attracted or repulsed relative to the magnetic field of the stator windings 208 producing rotation of the rotor 202.

Figure 5B:
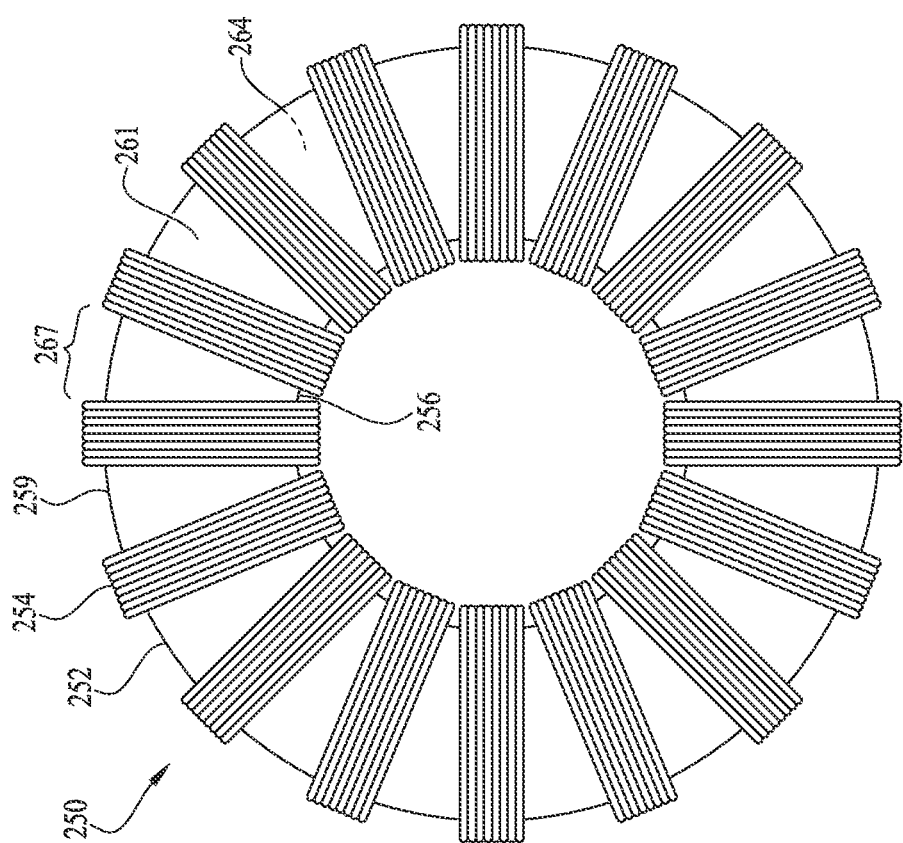
FIG. 5 A-D is a perspective view showing an embodiment of a stator structure according to the present invention.
Figure 5A:
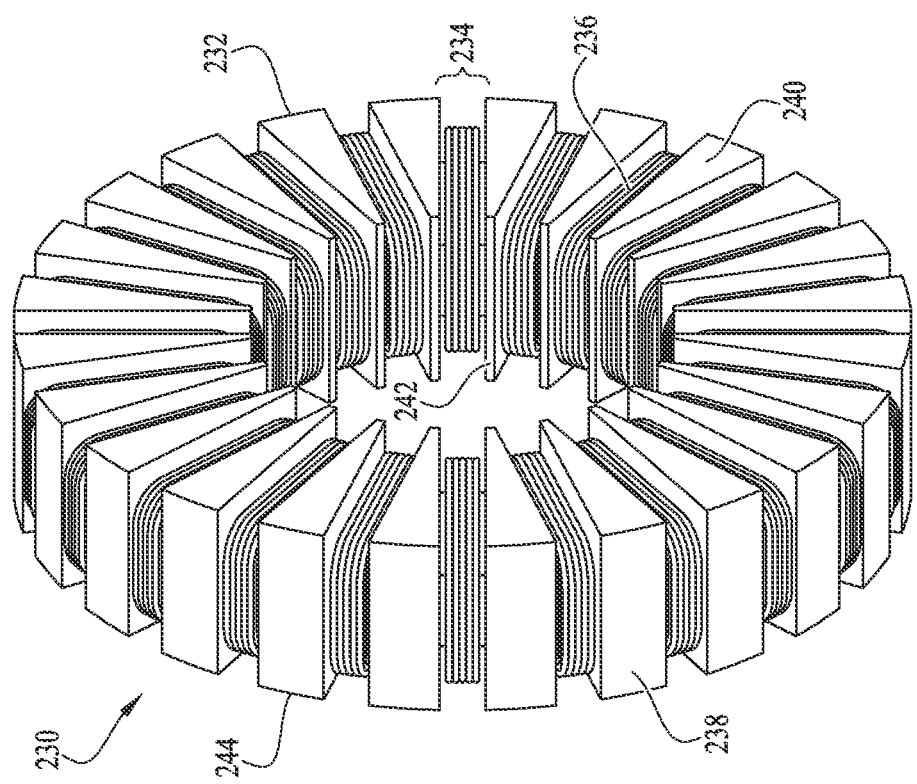

An alternate embodiment for the stator 230 is shown in FIG. 5A with a slotted core. The stator core 232 has slots or channels 234 formed radially and distributed about the circumference. The channels 234 are formed radially across the front surface 240 and back surface 244 and axially across the top surface 238 and bottom surface 242 to form a unitary channel about the stator core 232. A plurality of channels 234 are distributed around the circumference of the stator core 232. Electromagnetic windings 236 are in the radial direction are placed in the channels 234.

An alternate embodiment for the stator 250 is shown in FIG. 5B with a non-slotted core. The stator core 252 may have electromagnetic windings 254 that are wound in the radial direction for a partial torus shape about the stator core 252. The electromagnetic windings 254 may be the same width across the bottom surface 256 and top surface 259 of the stator core 252. The gap 267 between electromagnetic windings 254 may be larger near the top surface 259 than near the bottom surface 256 across the front surface 261 and back surface 264 of the stator core 252.

Figure 5D:
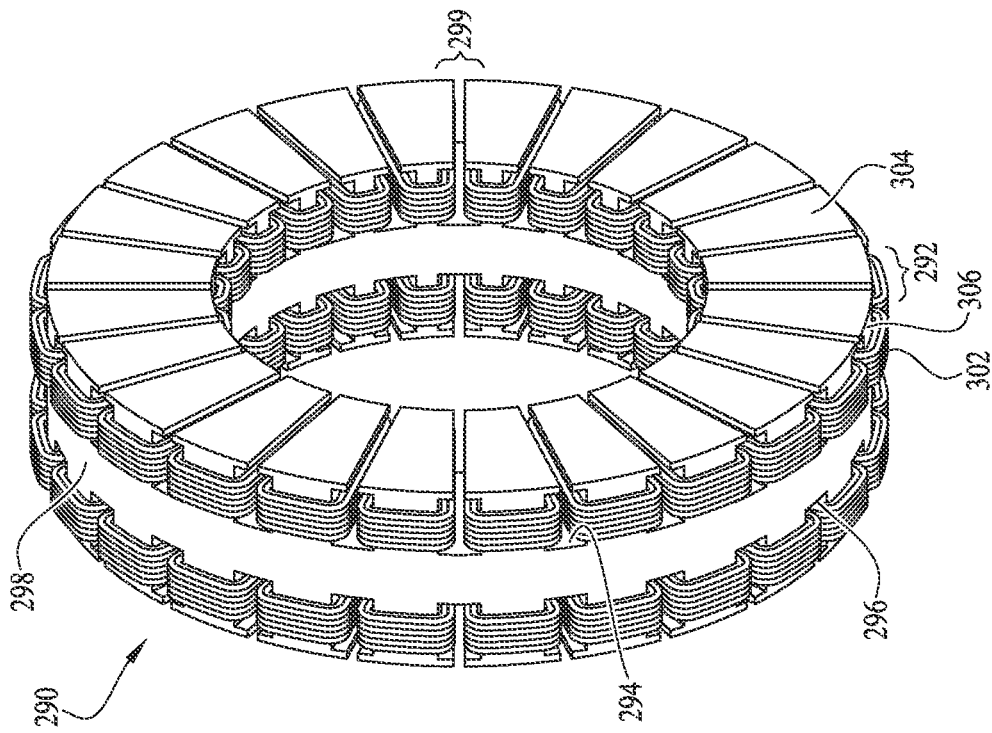
Figure 5C:
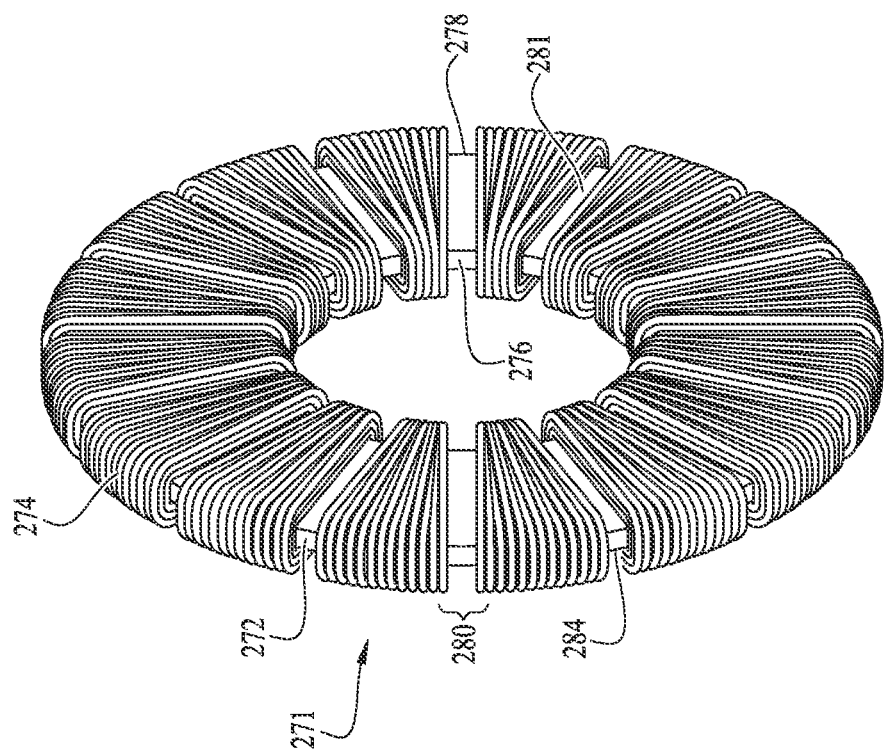

An alternate embodiment for the stator 271 is shown in FIG. 5C with a non-slotted core. The stator core 272 may have electromagnetic windings 274 that are wound in the radial direction for a partial torus shape about the stator core 272. The electromagnetic windings 274 form a wedge shape with a smaller width across the bottom surface 276 and a larger width across the top surface 278 of the stator core 272. The gap 281 between the electromagnetic windings 274 may be the same width along the front surface 282 and back surface 284 of the stator core 272.

An alternate embodiment for the stator 290 is shown in FIG. 5D with stator winding 292 mounted on the front surface 294 and back surface 296 of the stator core 298. A plurality of stator windings 292 are angularly spaced on a stator core 298 separated by gap 299. Each stator winding 292 may have an electromagnet coil 302 wound about a stator winding core 304 on a coil insulator 306.

The axial flux motor 200 may be configured with rotor 202 and stator 206 arranged as shown in FIG. 6A-E. The rotor 202 has a rotary shaft 212 (not shown) that extends out of the motor housing (not shown) to transfer rotational torque from the magnetic flux. The stator 206 has a set of electromagnetic windings that generate a magnetic force from applied electrical current.

Figure 6A:
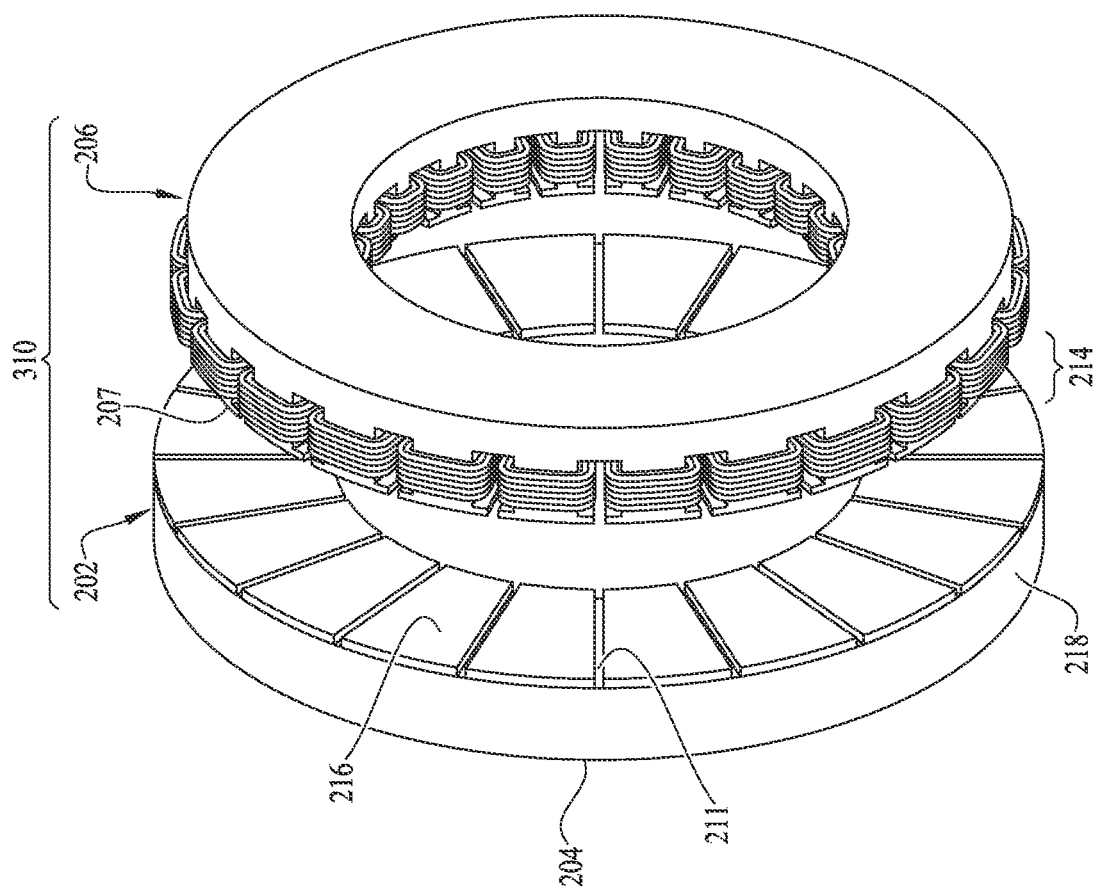
FIG. 6 A-H is a perspective view showing an axial gap type motor of an embodiment according to the present invention.

The first rotor stator combination 310 is illustrated in FIG. 6A has a single axial gap 214 with a single rotor 202 and single stator 206. The rotor 202 may have permanent magnets 216 mounted to the back surface 211 of the rotor disk 218. The stator 206 has electromagnetic coils 224 mounted to the stator front surface 207 facing the rotor 202. The magnetic flux $\Phi$ travels across a single axial gap 214 to generate rotational torque. Although one stator configuration is shown for stator 206, any stator configuration shown in FIG. 4 or FIG. 5 may be used.

Figure 6B:
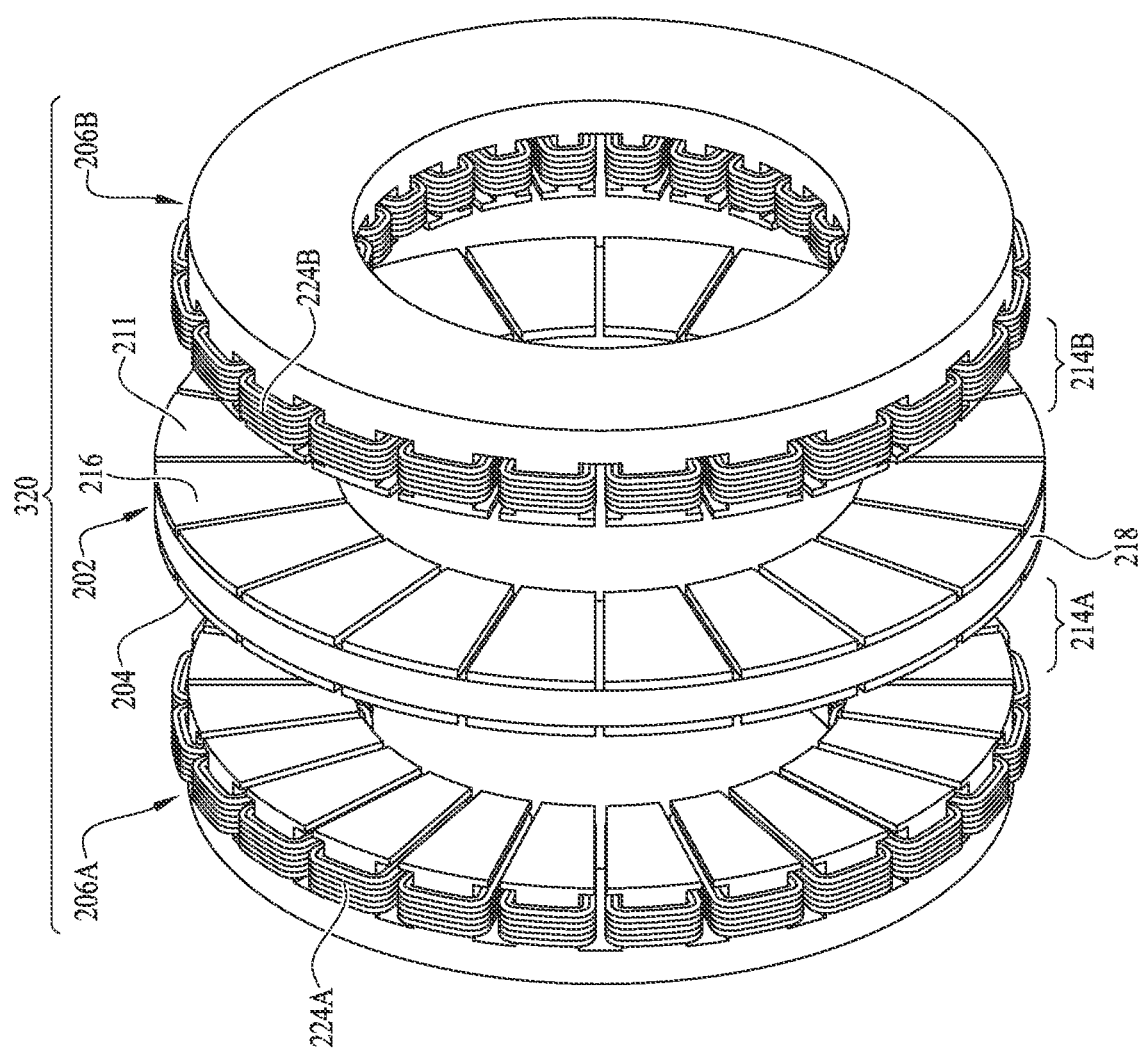

An alternate rotor stator combination 320 is illustrated in FIG. 6B has two axial gaps 214A and 214B with rotor 202 and two stators 206A and 206B. The rotor 202 may have permanent magnets 216 mounted to the rotor front surface 204 and back surface 211 of the rotor disk 218 or permanent magnets 216 mounted within the rotor disk 218. The stator 206A and 206B has electromagnetic coils 224 mounted to the surface facing the rotor 202. The magnetic flux $\Phi$ travels across two axial gaps 214A and 214B to generate rotational torque. Although one stator configuration is shown for stator 206A and 206B, any stator configuration shown in FIG. 4 or FIG. 5 may be used.

An alternate rotor stator combination 330 is illustrated in FIG. 6C has two axial gaps 214A and 214B with two rotors 202A and 202B and stator 230. The rotor 202A may have permanent magnets 216 mounted to the back surface 211A of the rotor disk 218A or permanent magnets 216 mounted within the rotor disk 218A. The rotor 202B may have permanent magnets 216 mounted to the front surface 204B of the rotor disk 218B or permanent magnets 216 mounted within the rotor disk 218B. The stator 230 has electromagnetic windings 236 wound through the slots that develop a magnetic field on the front surface 240 and back surface 244 of the stator core 232. The magnetic flux $\Phi$ travels across two axial gaps 214A and 214B to generate rotational torque. Although one stator configuration is shown for stator 230, any stator configuration shown in FIG. 4 or FIG. 5 may be used.

An alternate rotor stator combination 340 is illustrated in FIG. 6D has four gaps 214A-D with three rotors 202A-C and two stators 230A and 230B. The rotor 202A may have permanent magnets 216 mounted to the back surface 211A of the rotor disk 218A or permanent magnets 216 mounted within the rotor disk 218A. The rotor 202B may have permanent magnets 216 mounted to the front surface 204B and back surface 211B of the rotor disk 218A may have permanent magnets 216 mounted within the rotor disk 218B. The rotor 202C may have permanent magnets 216 mounted to the front surface 204C of the rotor disk 218A or permanent magnets 216 mounted within the rotor disk 218C. The stator 230A and 230B has electromagnetic windings 236 wound through the slots that develop a magnetic field on the front surface 240A and 240B and back surface 244A and 244B of the stator core 232A and 232B. The magnetic flux $\Phi$ travels across four axial gaps 214A, 214B, 214C, and 214D to generate rotational torque. Although one stator configuration is shown for stator 230A and 230B, any stator configuration shown in FIG. 4 or FIG. 5 may be used.

Figure 6E:
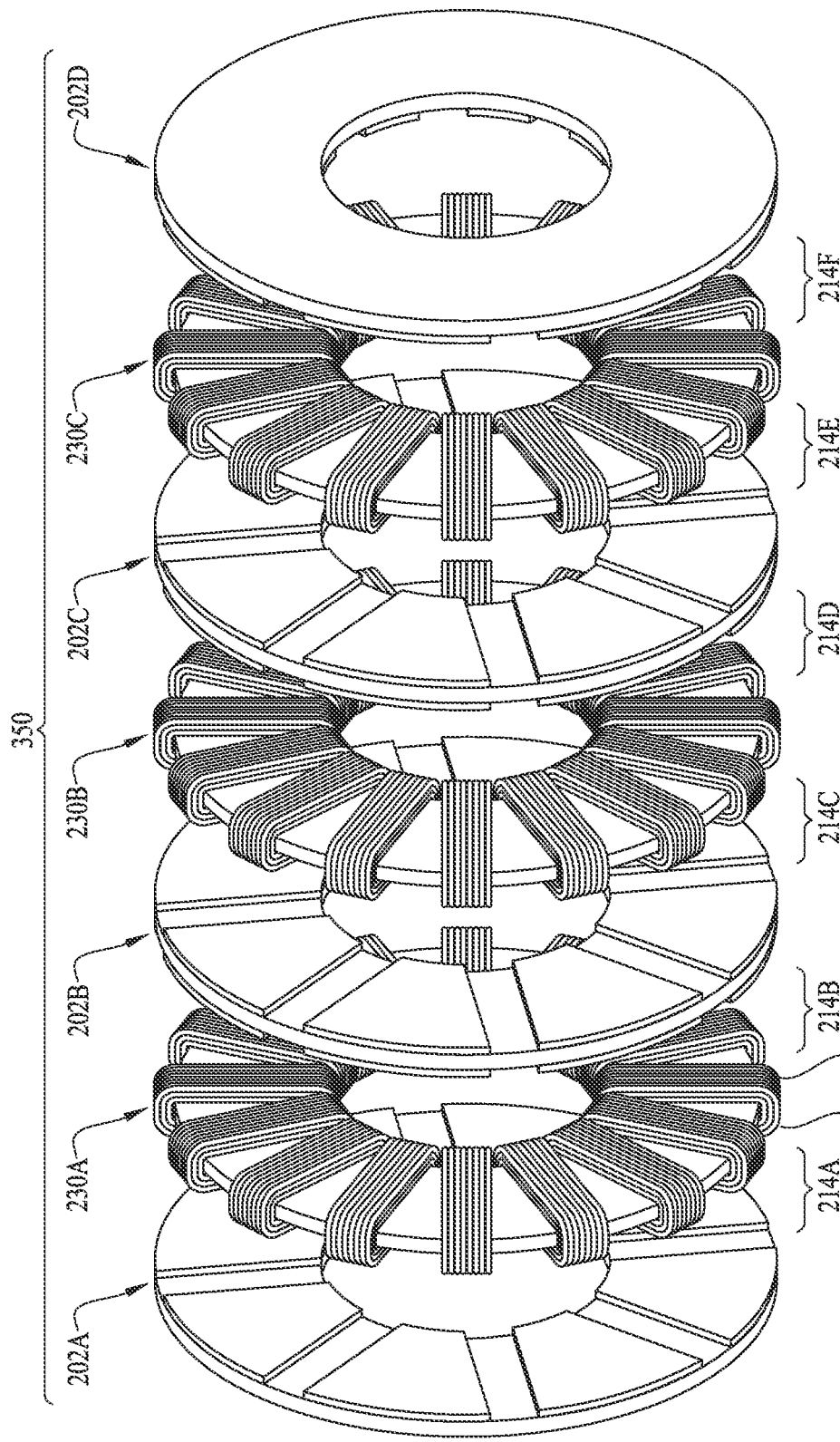

An alternate rotor stator combination 350 is illustrated in FIG. 6E has six gaps 214A-F with four rotors 202A-D and three stators 230A-C. The magnetic flux $\Phi$ travels across six axial gaps 214A, 214B, 214C, 214D, 214E, and 214F to generate rotational torque. Although one stator configuration is shown for stator 230A-C, any stator configuration shown in FIG. 4 or FIG. 5 may be used.

Figure 6F:
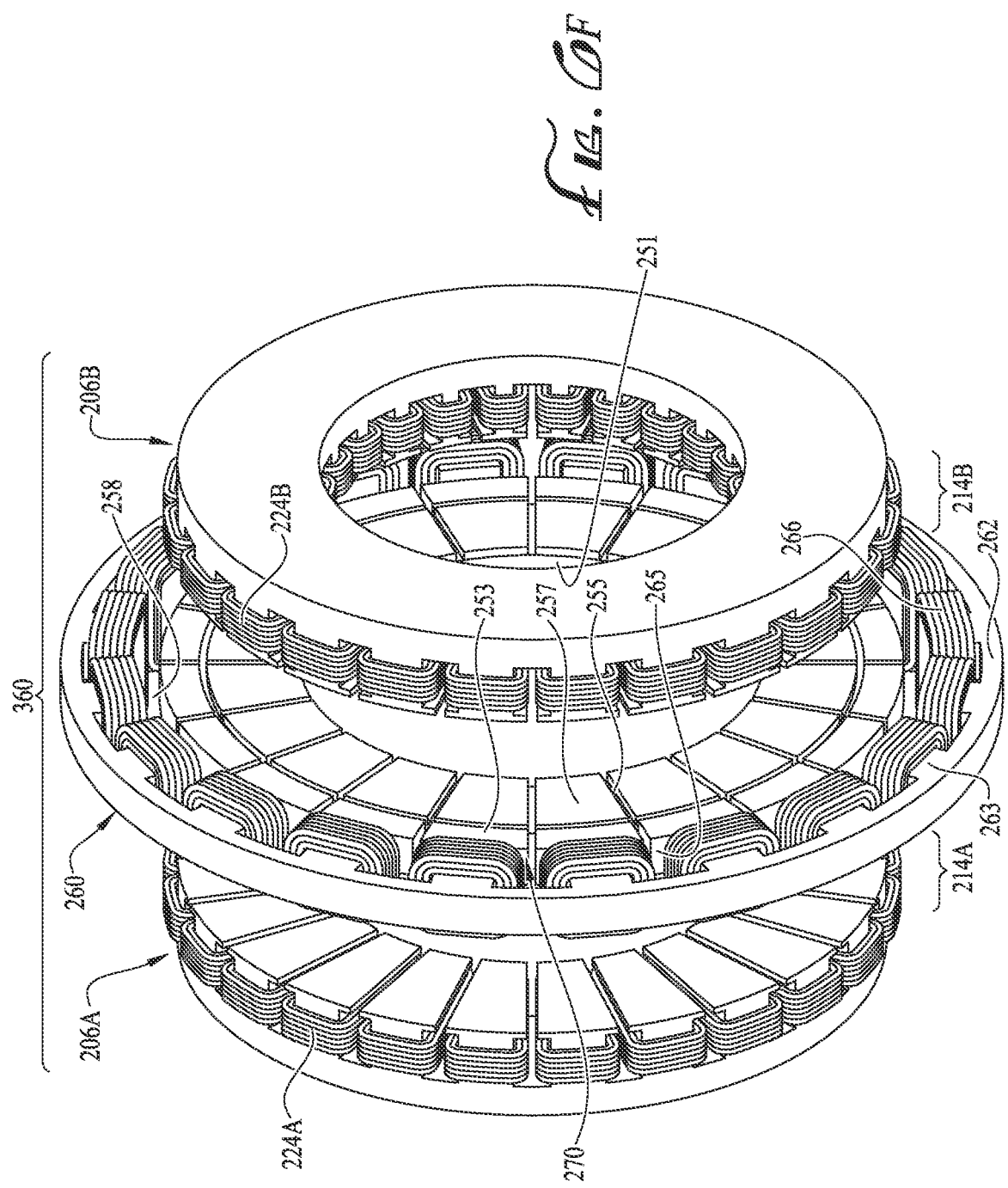

An alternate rotor stator combination 360 is illustrated in FIG. 6F has three gaps with two axial gaps 214A-B and one radial gap 258 with one rotor 270 and two axial stators 206A and 206B and one radial stator 260. The rotor 270 may have an axial set of permanent magnets 257 mounted to the front surface 255 and back surface of the rotor disk 251 or permanent magnets 257 mounted within the rotor disk 251. The rotor 270 may have radial permanent magnets 253 mounted to the top surface 265 of rotor disk 251. The stator 206A and 206B have axial gaps 214A and 214B with the rotor 270. The stator 206A and 206B are parallel to rotor 270 and have electromagnetic coils 224 mounted to the surface facing the rotor 270. The magnetic flux $\Phi$ travels across two axial gaps 214A and 214B to generate rotational torque. The radial stator 260 has a radial gap 258 with the rotor 270. The radial stator 260 is perpendicular to the axis of rotation and aligned with the top surface 265 of rotor 270. The radial stator 260 has a stator core 262 with electromagnetic coils 266 mounted onto stator windings 263 aligned to face the rotor 270. The magnetic flux $\Phi$ from stator 260 travels radially across radial gap 258 to generate rotational torque. Although radial stator 260 and 206A-B are shown, any stator configuration shown in FIG. 4 or FIG. 5 may be used.

An alternate rotor stator combination 370 is illustrated in FIG. 6G has three gaps with two axial gaps 214A-B and one radial gap 258 with one stator 250 and rotors 202A and 202B and one radial rotor 280. In this embodiment the stator 250 may be connected to an axial shaft (not shown) to rotate within the axial rotors 202A-B and radial rotor 280. The radial rotor 280 and rotors 202A and 202-B are mechanically connected and are not fixed to the housing and do rotate. The rotor 202A may have permanent magnets 216 mounted to the back surface 211A of the rotor disk 218A or permanent magnets 216 mounted within the rotor disk 218A. The rotor 202B may have permanent magnets 216 mounted to the front surface 204B of the rotor disk 218B or permanent magnets 216 mounted within the rotor disk 218B. The stator 250 may have a non-slotted stator core 252 with electromagnetic windings 254 that are wound in the radial direction for a partial torus shape about the stator core 252. The stator 250 has axial gap 214A and 214B with the rotors 202A and 202B. The stator 250 is parallel to rotor disk 218A and rotor disk 218B. The magnetic flux Φ travels across two axial gaps 214A and 214B to generate rotational torque. The stator 250 has a radial gap 258 with the radial rotor 280. The radial rotor 280 is perpendicular and aligned with the top surface 259 of stator 250. The rotor 280 has a rotor core 283 with permanent magnets 286 mounted onto inner surface 288 aligned with outer surface 269 the stator 250. The magnetic flux Φ from stator 250 travels radially across gap 258 to generate rotational torque. Although stator 250 is shown, any stator configuration shown in FIG. 4 or FIG. 5 may be used.

An alternate rotor stator combination 380 is illustrated in FIG. 6H has three gaps with two axial gaps 214A-B and one radial gap 258 with stator 250, stators 206A, 206B, and one radial stator 260. In this embodiment the stator 250 may be connected to an axial shaft (not shown) to rotate within the axial stators 206A-B and radial stator 260. The radial stator 260 and axial stators 206A and 206B are fixed to the housing (not shown) and do not rotate. The stator 250 may have a non-slotted stator core 252 with electromagnetic windings 254 that are wound in the radial direction for a partial torus shape about the stator core 252. The stator 206A and 206B have axial gap 214A and 214B with the stator 250. The stator 206A and 206B are parallel to stator 250 and have electromagnetic coils 224 mounted to the surface facing the stator 250. The magnetic flux Φ travels across two axial gaps 214A and 214B to generate rotational torque. The radial stator 260 has a radial gap 258 with the stator 250. The radial stator 260 is perpendicular and aligned with the top surface 273 of stator 250. The stator 260 has a stator core 262 with electromagnetic coils 266 mounted onto stator windings 263 aligned to face the electromagnetic coils 266. The magnetic flux D from stator 260 travels radially across gaps 258 to generate rotational torque. Although radial stator 260 and stator 206A, 206B, and 250 are shown, any stator configuration shown in FIG. 4 or FIG. 5 may be used.

Turning now to FIG. 7A, an embodiment of an axial flux motor 400 connected to a seal section 410 is described. The seal section 410 may be attached to the axial flux motor 400 with one or more bolts 402. Although a bolt 402 is shown, any type of fastener may be utilized such as screws, nuts, threads, etc. The seal section coupling 406 may be threadingly engaged to the seal section shaft 408 and may have a sliding fit with splines to the rotary shaft 432.

The seal section 410 may include a bag seal, a labyrinth seal, a thrust bearing, debris exit ports, and thermal expansion chamber. The seal section 410 has a housing 412 sealingly connected to (or formed integral with) seal section base 411. A stationary thrust bearing surface 414 may be attached to, embedded into, or integral with seal section base 411. A thrust disk 416 may be attached to seal section shaft 408 such that the thrust disk 416 rotates with the seal section shaft 408. The thrust disk 416 may have rotating thrust bearing surface 418 and fluid port 420. The shaft seal assembly 422 may have one or more labyrinth seal, inflated bag seal, or both. The shaft seal assembly 422 may have multiple labyrinth seals, or inflated bag seals, or both in tandem.

The seal section 410 may have a rotating thrust bearing surface 418 engaged with a stationary thrust bearing surface 414. The pump assembly 20 may transfer a downward reaction force down the rotating shaft to the seal section shaft 408. The thrust disk 416 attached to the seal section shaft 408 transfers the force through the rotating thrust bearing surface 418 to the stationary thrust bearing surface 414 to the seal section base 411. The transfer of resultant downward force to the thrust bearing surfaces may isolate the axial flux motor 400 from the resultant downward force.

The cooling oil from the axial flux motor 400 may fill the seal section chamber 424 and lubricate the rotary thrust bearing surface 418 and stationary thrust bearing surface 414.

The axial flux motor 400 may be connected to the seal section 410 by bolts 402 threadingly engaged into motor head end surface 434. The motor housing 436 may contain front stator 440, front rotor 450, middle stator 460, back rotor 470, back stator 480, and base 490. The front stator 440, middle stator 460, and back stator 480 may be fixed to the motor housing 436 and do not rotate.

Front stator 440 may have a plurality of stator windings 444 angularly spaced on a stator core. Each stator winding 444 may have an electromagnet coil 442 wound about a stator winding core. The front stator 440 and front rotor 450 may be separated by gap 492. The front rotor 450 may be attached to rotary shaft 432 or may be formed of a unitary body. The front rotor 450 rotates about a central axis of the rotary shaft 432. The front surface 456 is perpendicular to the central axis of rotary shaft 432. A permanent magnet 454 may be mounted onto the front surface 456 of a rotor disk 452 or permanent magnets 454 may be mounted or fixed into the rotor disk 452. The permanent magnets 454 are arranged radially and spaced angularly to account for the radial and angular position of the stator windings 444. The polarity of the permanent magnets 454 is varied based on the angular position on the rotor disk 452, which can be provided by the rotary encoder discussed herein. Although one stator configuration for front stator 440 is shown, any stator configuration shown in FIG. 4 or FIG. 5 may be used.

A middle stator 460 may be attached between a front stator 440 and back stator 480. The middle stator 460 may have a plurality of electromagnetic windings 462 about a stator core 464. The electromagnetic windings 462 may be wound in a radial direction for a partial torus shape about the stator core 464. The stator core 464 may be slotted or channeled, or the stator core 464 may not be slotted. The electromagnetic windings 462 may be wound with the same width across the front surface 466 and back surface 468. The electromagnetic windings 462 may be wound with an angular shape with a constant gap between windings. The middle stator 460 is separated from the front rotor 450 by gap 494 and the back rotor 470 by gap 496. Although one stator configuration is shown for middle stator 460, any stator configuration shown in FIG. 4 or FIG. 5 may be used.

The back rotor 470 may be attached to rotary shaft 432 or may be formed of a unitary body. The back rotor 470 rotates about an axis common to the rotary shaft 432. The front surface 476 of back rotor 470 is perpendicular to the axis common to rotary shaft 432. A permanent magnet 474 may be mounted onto the front surface 476 of a rotor disk 472 or permanent magnets 474 may be mounted or fixed into the rotor disk 472. The permanent magnets 474 are arranged radially and spaced angularly to account for the radial and angular position of the electromagnetic windings 462. The polarity of the permanent magnets 474 is varied based on the angular position on the rotor disk 472, which can be provided with the rotary encoder discussed herein.

The back stator 480 may have a plurality of stator windings 484 angularly spaced on a stator winding core 486. Each stator winding 484 may have an electromagnet coil 482 wound about a stator winding core 486. The back stator 480 and back rotor 470 may be separated by gap 498. Although one stator configuration for stator 480 is shown, any stator configuration shown in FIG. 4 or FIG. 5 may be used.

The axial flux motor 400 may be configured with four axial gaps with two rotors and three stators. The magnetic flux Φ may travel across gaps 492, 494, 496, and 498 to generate rotational torque. The magnetic flux Φ may be emitted from a stator across each gap 492, 494, 496, and 498 and return to the emitting stator to influence the permanent magnets on the rotor to induce rotation. The magnetic flux Φ may be emitted from a stator and cross a gap, through a rotor, across a gap, to a stator and return to the emitting stator to influence the permanent magnets on the rotor to induce rotation. The magnetic flux Φ may travel from one stator through one or more gaps to influence the permanent magnetics on the rotors to induce rotation. The magnetic flux Φ may travel from stator 440 across gap 492 to front rotor 450 and return across gap 492. The magnetic flux Φ may travel from stator 440, across gap 492, through front rotor 450, across gap 494, to middle stator 460. The given flux path Φ may change depending on the type of stator and rotor configuration. The given flux path Φ may change depending on the polarity of the rotor magnet in a stator and rotor configuration. Although two magnetic flux Φ paths have been described, it is understood that any rotor stator combination and any magnetic flux path may be used without deviating from the disclosure.

The back stator 480 may be connected to base 490 and/or motor housing 436, and base 490 can have internal bearings. Rotary shaft bearings 491 may be located on the outer surface 493 of rotary shaft 432 and in a bearing race 497 inside the base 490. The rotary shaft bearings 491 may be configured to support the rotors, reduce vibration, and distribute radial and axial bearing loading. The rotary shaft bearings 491 may be rolling element type bearings such as rotationally sliding sleeve bearing, bushing bearings, ball bearings, roller bearings, spherical roller, tapered roller, or needle roller. The rotary shaft bearings 491 may be housed inside an open assembly that allows lubricating fluid to flow through or a closed assembly with a sealed structure. The rotary shaft bearings 491 may be any of the listed configurations or any combination thereof. The rotary shaft bearings 491 may be constructed of bronze, steel alloy, nickel alloy, ceramics, graphite, composite materials, or any combination thereof.

Although the rotary shaft bearings 491 are shown in one location, the rotary shaft bearings 491 may be placed in multiple locations within the axial flux motor 400. The rotary shaft bearings 491 may be placed between front rotor 450 and back rotor 470. The rotary shaft bearing 491 may be placed adjacent to front surface and back surface of each rotor. Each of the rotary shaft bearings 491 placed in the axial flux motor 400 may be the same type of bearing or may be multiple types of bearings.

In an alternate embodiment, the rotary shaft bearing 491 may be a thrust bearing. The rotary shaft bearing 491 may have a rotating thrust bearing surface mated with a stationary thrust bearing surface (not shown). The axial flux motor 400 may have one or more thrust bearings and one or more rotary shaft bearings 491, for example of the type shown in seal section 410 of FIG. 7A.

Figure 7B:
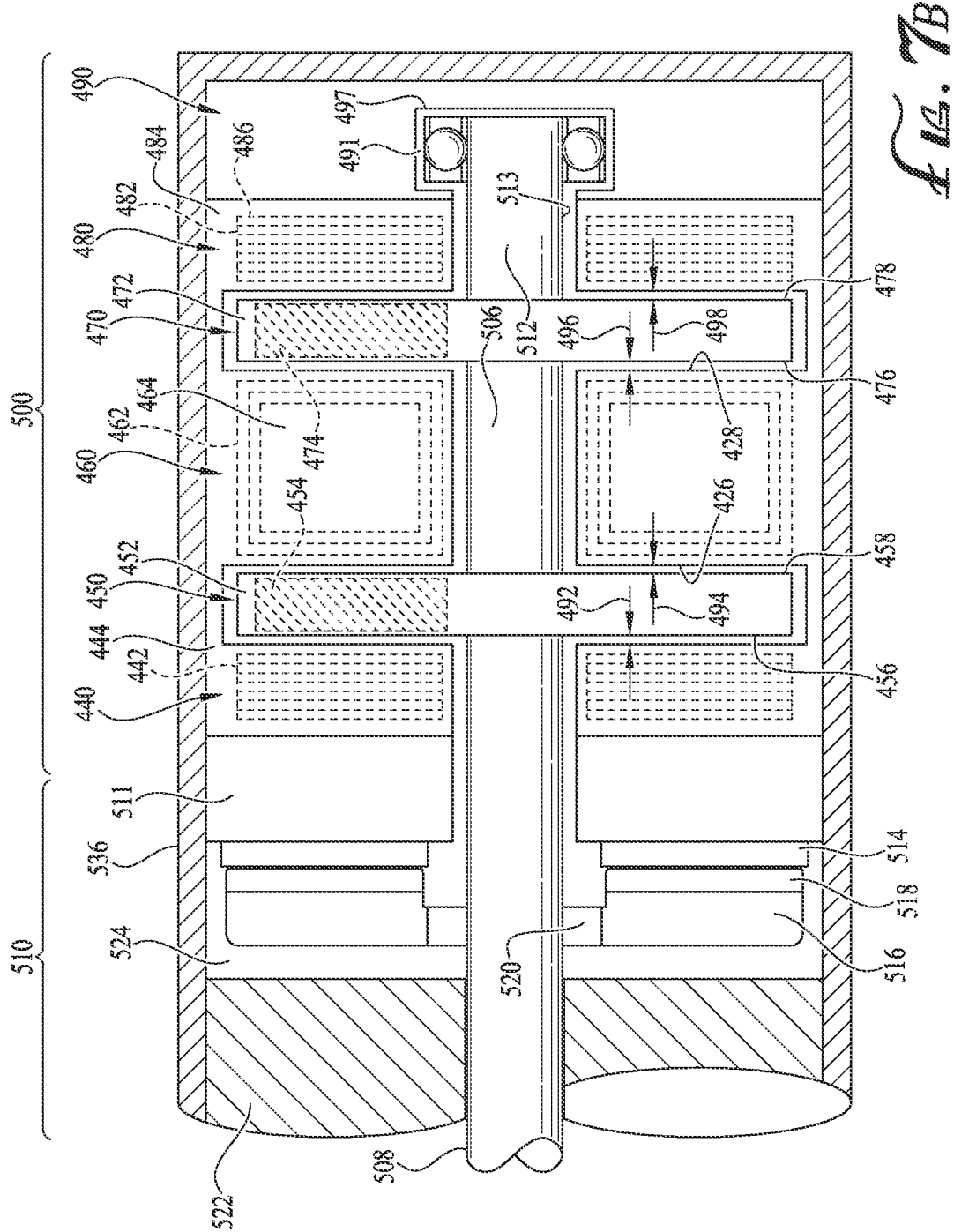
FIG. 7 A-D is a sectional view showing the rotors and stators of the axial gap type motor according to an embodiment of the present invention.

In an aspect, all or a portion of the seal section 40 of FIG. 1 can be incorporated into a common housing with the axial flux motor 50, for example disposed within a common housing or sub-assembly. Turning now to FIG. 7B, an embodiment of an axial flux motor 500 and seal section 510 with a common rotary shaft 508 is described. In this embodiment, the seal section 510 and axial flux motor 500 may share a singular motor housing 536 and a common rotary shaft 508. The motor housing 536 may contain the seal section 510 (corresponding to one or more components of seal section 410 of FIG. 7A) and the axial flux motor 500. A rotary shaft 508 may extend from the front rotor 450 into the seal section 510. As shown in FIG. 7B, the seal section 510 comprises a thrust bearing 514/516 and shaft seal assembly 522 within a common housing with the axial flux motor 50. In an alternative embodiment, the thrust bearing 514/516 is contained within a common housing with the axial flux motor 50, and other components of the shaft seal assembly 522 may be contained within a separate housing that is mechanically connected (e.g., bolted or threaded) to the motor housing 536, for example as shown in FIG. 7A (e.g., housing 412 bolted to motor housing 436).

The seal section 510 may contain a bag seal, a labyrinth seal, a thrust bearing, debris exit ports, and thermal expansion chamber. A seal section head 511 may be fixed to the motor housing 536. A stationary thrust bearing surface 514 may be attached to, embedded into, or integral with seal section head 511. A thrust disk 516 may be attached to rotary shaft 508 such that the thrust disk 516 rotates with the rotary shaft 508. The thrust disk 516 may have rotating thrust bearing surface 518 and fluid port 520. The shaft seal assembly 522 may have one or more labyrinth seal, inflated bag seal, or both. The shaft seal assembly 522 may have multiple labyrinth seals, inflated bag seals, or both in tandem.

The seal section 510 may have a rotating thrust bearing surface 518 engaged with a stationary thrust bearing surface 514. The pump assembly 20 may transfer a downward reaction force along the rotating shaft to the rotary shaft 508. The thrust disk 516 attached to the rotary shaft 508 transfers the force through the rotating thrust bearing surface 518 to the stationary thrust bearing surface 514 to the seal section head 511. The transfer of resultant downward force to the thrust bearing surfaces may isolate the axial flux motor 500 from the resultant downward force.

The cooling oil from the axial flux motor 500 may fill the seal section chamber 524 and lubricate the rotary thrust bearing surface 518 and stationary thrust bearing surface 514.

The axial flux motor 500 may be connected to the seal section 510 by an elongated motor housing 536. The motor housing 536 may contain front stator 440, front rotor 450, middle stator 460, back rotor 470, back stator 480, and base 490. The front stator 440, middle stator 460, and back stator 480 may be fixed to the motor housing 536 and do not rotate.

The front rotor 450 may be attached to rotary shaft 508 or may be formed of a unitary body. The front rotor 450 rotates about a central axis of the rotary shaft 508. The front surface 456 is perpendicular to the central axis of rotary shaft 508. A permanent magnet 454 may be mounted onto the front surface 456 of a rotor disk 452 or permanent magnets 454 may be mounted or fixed into the rotor disk 452. The permanent magnets 454 are arranged radially and spaced angularly to account for the radial and angular position of the stator windings 444. The polarity of the permanent magnets 454 is varied based on the angular position on the rotor disk 452, which can be provided by the rotary encoder discussed herein. The front rotor 450 may be attached to middle rotary shaft 506 or may be formed of a unitary body.

The front stator 440 may be attached to the seal section head 511 and/or the motor housing 536. Front stator 440 may have a plurality of stator windings 444 angularly spaced on a stator core. Each stator winding 444 may have an electromagnet coil 442 wound about a stator winding core. The front stator 440 and front rotor 450 may be separated by gap 492. Although one stator configuration for front stator 440 is shown, any stator configuration shown in FIG. 4 or FIG. 5 may be used.

A middle stator 460 may be attached between a front stator 440 and back stator 480. The middle stator 460 may have a plurality of electromagnetic windings 462 about a stator core 464. The electromagnetic windings 462 may be wound in a radial direction for a partial torus shape about the stator core 464. The stator core 464 may be slotted or channeled. The stator core 464 may not be slotted. The electromagnetic windings 462 may be wound with the same width across the front surface 466 and back surface 468. The electromagnetic windings 462 may be wound with an angular shape with a constant gap between windings. The middle stator 460 is separated from the front rotor 450 by gap 494 and the back rotor 470 by gap 496. Although one stator configuration for middle stator 460 is shown, any stator configuration shown in FIG. 4 or FIG. 5 may be used.

The back rotor 470 may be attached to middle rotary shaft 506 or may be made from unitary construction. The back rotor 470 rotates about an axis common to the middle rotary shaft 506. The front surface 476 of back rotor 470 is perpendicular to the axis common to middle rotary shaft 506. A permanent magnet 474 may be mounted onto the front surface 476 of a rotor disk 472 or permanent magnets 474 may be mounted or fixed into the rotor disk 472. The permanent magnets 474 are arranged radially and spaced angularly to account for the radial and angular position of the electromagnetic windings 462. The polarity of the permanent magnets 474 is varied based on the angular position on the rotor disk 472, which can be provided with the rotary encoder discussed herein.

The back stator 480 may have a plurality of stator windings 484 angularly spaced on a stator winding core 486. Each stator winding 484 may have an electromagnet coil 482 wound about a stator winding core 486. The back stator 480 and back rotor 470 may be separated by gap 498. Although one stator configuration for back stator 480 is shown, any stator configuration shown in FIG. 4 or FIG. 5 may be used.

The back stator 480 may be connected to base 490 and motor housing 536. Rotary shaft bearings 491 may be located on the outer surface 513 of back rotary shaft 512 and in a bearing race 497 inside the base 490. The rotary shaft bearings 491 may be configured to support the rotors, reduce vibration, and distribute radial and axial bearing loading.

Although the rotary shaft bearings 491 are shown in one location, the rotary shaft bearings 491 may be placed in multiple locations within the axial flux motor 500. The rotary shaft bearings 491 may be placed between front rotor 450 and back rotor 470. The rotary shaft bearing 491 may be placed adjacent to front surface and back surface of each rotor. Each of the rotary shaft bearings 491 placed in the axial flux motor 500 may be the same type of bearing or may be multiple types of bearings.

Turning now to FIG. 7C, an embodiment of an axial flux motor 600, seal section 610, and heat exchange system 620 is described. In this embodiment, the seal section 610 and axial flux motor 600 may be in separate housings that are releasably connected, for example as shown with reference to bolts 402 and seal section coupling 406 of FIG. 7A, or the seal section 610 and the axial flux motor 600 may share a common housing and shaft, for example as shown with reference to motor housing 536 and rotary shaft 508 of FIG. 7B. An oil pump within the heat exchanger system 620 may circulate cooling oil through the axial flux motor 600. The axial flux motor 600 has an outer housing 660 that exchanges heat from the cooling oil with the ambient wellbore.

The seal section 610 may contain a bag seal, a labyrinth seal, a thrust bearing, debris exit ports, and thermal expansion chamber within chamber 622, for example (without limitation) as described with references to seal section 510 of FIG. 7B. The seal section head 511 may be fixed to the inner housing 650 or may be releasably connected with removable fasteners as shown in FIG. 7A. The seal section 610 may be sealed to the axial flux motor 600 with seals, continuous housing, or any other method known to those in the art.

The axial flux motor 600 may have an inner housing 650 and an outer housing 660. The inner housing 650 may contain front stator 440, front rotor 450, middle stator 460, back rotor 470, back stator 480, and oil pump section 495. The front stator 440, middle stator 460, and back stator 480 may be fixed to the inner housing 650 and do not rotate. The front stator 440, front rotor 450, middle stator 460, back rotor 470, back stator 480 can be configured and function as described with reference to the like components of FIG. 7A.

The front rotor 450 may be attached to rotary shaft 608 or may be formed of a unitary body. The front rotor 450 rotates about a central axis of the rotary shaft 608. The front surface 456 is perpendicular to the central axis of rotary shaft 608. The front rotor may have permanent magnets as described in FIG. 7A. The front rotor 450 may be attached to middle rotary shaft 606 or may be formed of a unitary body.

The front stator 440 may be attached to the seal section head 611 and the inner housing 650. Front stator 440 may have a plurality of stator windings 444 angularly spaced on a stator core. Each stator winding 444 may have an electromagnet coil 442 wound about a stator winding core. The front stator 440 and front rotor 450 may be separated by gap 492. Although one stator configuration for front stator 440 is shown, any stator configuration shown in FIG. 4 or FIG. 5 may be used.

A middle stator 460 may be attached between a front stator 440 and back stator 480. The middle stator 460 may have a plurality of electromagnetic windings 462 about a stator core 464. The electromagnetic windings 462 may be wound in a radial direction for a partial torus shape about the stator core 464. The stator core 464 may be slotted or channeled, or the stator core 464 may not be slotted. The electromagnetic windings 462 may be wound with the same width across the front surface 466 and back surface 468. The electromagnetic windings 462 may be wound with an angular shape with a constant gap between windings. The middle stator 460 is separated from the front rotor 450 by gap 494 and the back rotor 470 by gap 496. Although one stator configuration is shown for middle stator 460, any stator configuration shown in FIG. 4 or FIG. 5 may be used.

The back rotor 470 may be attached to middle rotary shaft 606 or may be made from unitary construction. The back rotor 470 rotates about an axis common to the middle rotary shaft 506. The front surface 476 of back rotor 470 is perpendicular to the axis common to middle rotary shaft 606. The back rotor 470 may contain permanent magnets as described with FIGS. 7A and 7B. The back rotor 470 may have a back rotary shaft 626 attached to the back surface 468 of the rotor disk 472. The polarity of the permanent magnets 474 is varied based on the angular position on the rotor disk 472, which can be provided with the rotary encoder discussed herein.

The back stator 480 may have a plurality of stator windings 484 angularly spaced on a stator winding core 486. Each stator winding 484 may have an electromagnet coil 482 wound about a stator winding core 486. The back stator 480 and back rotor 470 may be separated by gap 498. Although one stator configuration for stator 480 is shown, any stator configuration shown in FIG. 4 or FIG. 5 may be used.

The back stator 480 may be connected to oil pump section 495 and inner housing 650. The rotary shaft bearings 491 may be configured to support the rotors, reduce vibration, and distribute radial and axial bearing loading.

In an embodiment, the oil pump section 495 circulates oil through the axial flux motor 600 to transfer the heat generated by the electromagnetic coils.

Rotational motion of the back rotary shaft 626 provides the rotary motion to the oil pump to pressurize the oil. The oil pumping mechanism may be an impeller and diffuser, however any type of rotary pumping method may be utilized: external gear pump, internal gear pump, lobe pump, sliding vane pump, piston pump, single screw pump, double screw pump, single stage centrifugal pump, or multistage centrifugal pump, or any similar pump type.

Although the oil pump section 495 is shown attached the bottom of the axial flux motor 600, the oil pump section 495 may be attached between the axial flux motor 600 and the seal section 610. Although the impeller and diffuser is shown attached to the back rotary shaft 626, the oil pump may have a motor independent of the axial flux motor. Although the oil pump is shown as a separate impeller inside of a diffuser, the oil pump may be formed by vanes or impellers on the rotors.

Figure 7D:
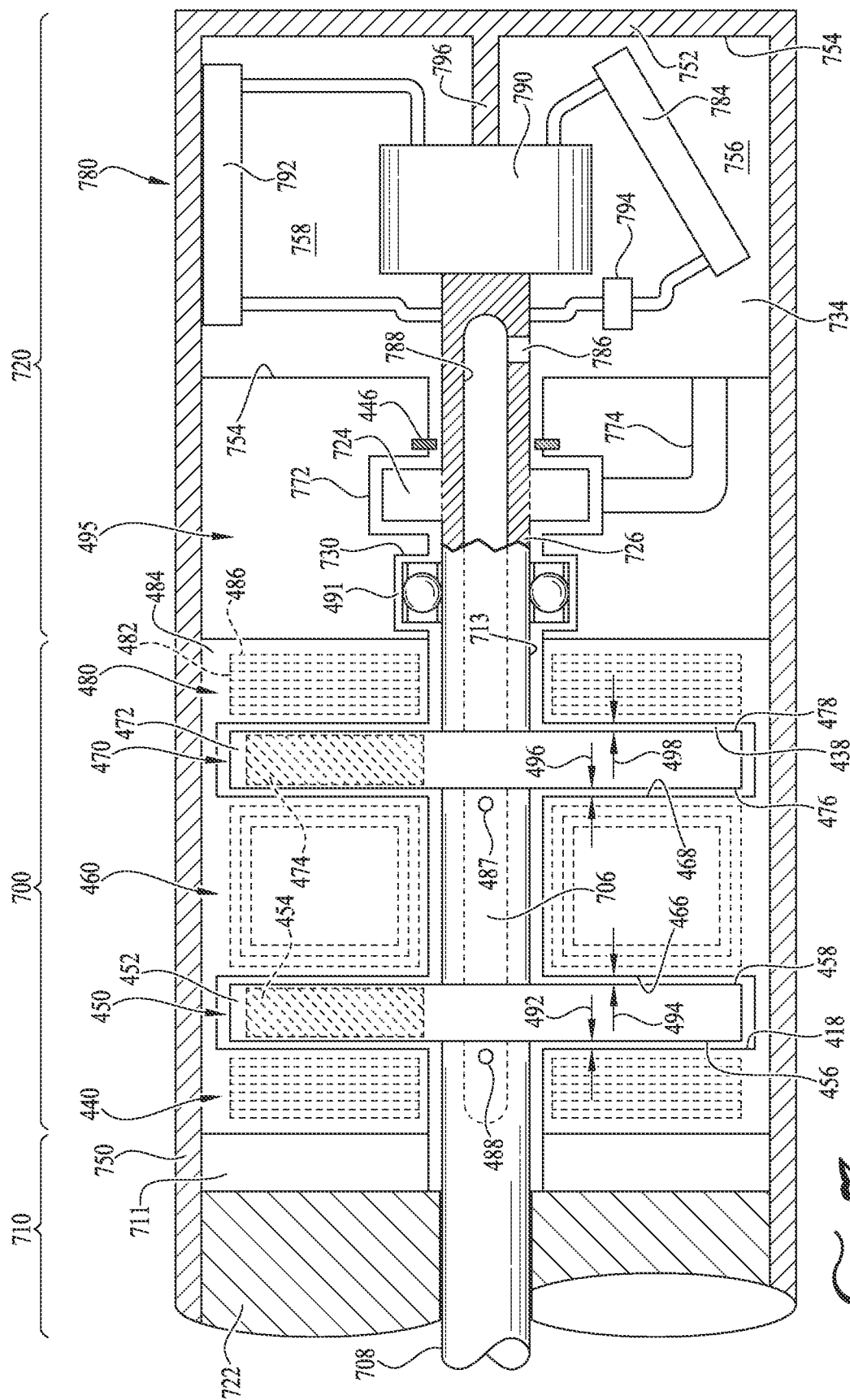

Turning now to FIG. 7D, an embodiment of an axial flux motor 700, seal section 710, and heat exchange system 720 is described. The embodiment of FIG. 7D is similar to the embodiment of FIG. 7C, except that the heat exchanger system 720 having a refrigeration assembly is shown and described in FIG. 7D as an alternative to the heat exchanger system 620 of FIG. 7C. In this embodiment, the axial flux motor 700 may be in separate housings that are releasably connected, for example as shown with reference to bolts 402 and seal section coupling 406 of FIG. 7A, or the seal section 610 and the axial flux motor 600 may share a common housing an shaft, for example as shown with reference to motor housing 536 and rotary shaft 508 of FIG. 7B. An oil pump within the heat exchanger system 720 may circulate cooling oil through the axial flux motor 700. The heat exchanger system 720 may have a refrigeration assembly to cool the oil circulated by an oil pump.

The seal section 710 may contain a bag seal, a labyrinth seal, a thrust bearing, debris exit ports, and thermal expansion chamber within chamber 722, for example (without limitation) as described with reference to seal section 510 of FIG. 7B. The seal section head 511 may be fixed to the motor housing 750 or may be releasably connected with removable fasteners as shown in FIG. 7A. The seal section 710 may be sealed to the axial flux motor 700 with seals, continuous housing, or any other method known to those in the art.

The axial flux motor 700 may have a motor housing 750 containing a front stator 440, front rotor 450, middle stator 460, back rotor 470, back stator 480, and oil pump section 495. The front stator 440, middle stator 460, and back stator 480 may be fixed to the motor housing 750 and do not rotate. The front stator 440, front rotor 450, middle stator 460, back rotor 470, back stator 480 can be configured and function as described with reference to the like components of FIG. 7A.

The front rotor 450 may be attached to rotary shaft 708 or may be formed of a unitary body. The front rotor 450 rotates about a central axis of the rotary shaft 708. The front surface 456 is perpendicular to the central axis of rotary shaft 708. The front rotor may have permanent magnets as described in FIG. 7A. The front rotor 450 may be attached to middle rotary shaft 706 or may be formed of a unitary body.

The front stator 440 may be attached to the seal section head 711 and the motor housing 750. Front stator 440 may have a plurality of stator windings 444 angularly spaced on a stator core. Each stator winding 444 may have an electromagnet coil 442 wound about a stator winding core. The front stator 440 and front rotor 450 may be separated by gap 492. Although one stator configuration for front stator 440 is shown, any stator configuration shown in FIG. 4 or FIG. 5 may be used.

A middle stator 460 may be attached between a front stator 440 and back stator 480. The middle stator 460 may have a plurality of electromagnetic windings 462 about a stator core 464. The electromagnetic windings 462 may be wound in a radial direction for a partial torus shape about the stator core 464. The stator core 464 may be slotted or channeled, or the stator core 464 may not be slotted. The electromagnetic windings 462 may be wound with the same width across the front surface 466 and back surface 468. The electromagnetic windings 462 may be wound with an angular shape with a constant gap between windings. The middle stator 460 is separated from the front rotor 450 by gap 494 and the back rotor 470 by gap 496. Although one stator configuration is shown for middle stator 460, any stator configuration shown in FIG. 4 or FIG. 5 may be used.

The back rotor 470 may be attached to middle rotary shaft 706 or may be made from unitary construction. The back rotor 470 rotates about an axis common to the middle rotary shaft 506. The front surface 476 of back rotor 470 is perpendicular to the axis common to middle rotary shaft 606. The back rotor 470 may contain permanent magnets as described with FIGS. 7A and 7B. The back rotor 470 may have a rotary shaft 726 attached to the back surface 468 of the rotor disk 472. The polarity of the permanent magnets 474 is varied based on the angular position on the rotor disk 472, which can be provided with the rotary encoder discussed herein.

The back stator 480 may have a plurality of stator windings 484 angularly spaced on a stator winding core 486. Each stator winding 484 may have an electromagnet coil 482 wound about a stator winding core 486. The back stator 480 and back rotor 470 may be separated by gap 498. Although one stator configuration for stator 480 is shown, any stator configuration shown in FIG. 4 or FIG. 5 may be used.

The back stator 480 may be connected to oil pump section 495 and motor housing 750. Rotary shaft bearings 491 may be configured to support the rotors, reduce vibration, and distribute radial and axial bearing loading.

In an embodiment, the oil pump section 495 circulates oil from the axial flux motor 700 to a reservoir chamber with a refrigeration assembly 780 comprising a refrigeration cycle and related components (e.g., compressor, condenser, expansion valve, and evaporator). The oil transfers the heat generated by the electromagnetic coils to an oil reservoir 734 configured to exchange heat with the cooling coil 784 of the refrigeration assembly 780.

The oil pump section 495 may have an impeller 724 inside of a diffuser cavity 772. Rotational motion of the rotary shaft 726 turns the impeller 724 inside of the diffuser cavity 772 to pressurize the oil. The oil pumping mechanism may be an impeller and diffuser, however any type of rotary pumping method may be utilized: external gear pump, internal gear pump, lobe pump, sliding vane pump, piston pump, single screw pump, double screw pump, single stage centrifugal pump, or multistage centrifugal pump, or any similar pump type.

The oil may be pressurized by the oil pump section 495 to flow through exit port 774 and into the oil reservoir 734 defined by motor housing 750, bottom housing end 752, partition 796, and oil pump cap end surface 754. The oil may be cooled by cooling coil 784 before returning to the motor though ports 786 and into flow passage 788 (e.g., a hollow flow conduit inside rotary shaft 726). The cooling coil 784 generates a cooling surface from the refrigeration assembly 780. The refrigeration assembly 780 includes a compressor 790 that compresses a refrigerant mixture such as a fluorocarbon, ammonia, or propane working fluid. The compressor 790 may be powered by the rotary shaft 726 or with a secondary motor. The compressed fluid passes from the compressor 790 to the heat exchanger coil 792 that may be attached to the motor housing 750. The compressed fluid may exchange heat with the heat exchanger coil 792 that exchanges heat through the motor housing 750 to the ambient wellbore fluids outside of the motor housing 750. A partition 796 may separate the cooling compartment 756 with the cooling coil 784 from the heating compartment 758 with the heat exchanger coil 792. The compressed liquid refrigerant passes from the compressor 790 to the heat exchanger coil 792, through an expansion valve 794 where is expands to a gas and flows, into the cooling coil 784, then back to the compressor 790 for compression into a liquid and continued circulation though the refrigeration cycle.

The oil flow may pass though the flow passage 788 and out through upper flow port 488 and lower flow port 487 to flow through the gaps between the upper rotor, back rotor, and shaft to cool the stator coils and lubricate the axial and radial bearings.

Although the oil pump section 495 is shown attached the bottom of the axial flux motor 700, the oil pump section 495 may be attached between the axial flux motor 700 and the seal section 710.

Although the refrigeration assembly 780 and oil reservoir 734 is shown below the axial flux motor 700, the refrigeration assembly 780 and oil reservoir 734 may be located between the axial flux motor 700 and the seal section 710.

In an embodiment, the refrigeration assembly 780 and oil reservoir 734 may be located in the seal section 710.

Although the embodiment of pump system 100 is described as a production pump that pumps fluid from a well to a pipeline, the pump system 100 may be an injection pump that pumps fluid from the surface into a wellbore.

Turning now to FIG. 8, a method of modifying an embodiment of axial flux motor 800, attached to a seal section and pump assembly, is described. One or more pair of rotors and stators may be added, removed, or replaced from an axial flux motor. In an embodiment of axial flux motor 800, an assembly (or module) of rotor(s) 830B and stator(s) 840B may be added to an axial flux motor 800 that is attached to a seal section and pump assembly.

The axial flux motor 800 assembly before modification may include an end cap 820 connected to a seal section 893. End cap 820 and rotary shaft 802 may be connected to seal section 893 by threads, fasteners, welding, other connecting parts (not shown), or any other method that may be utilized by those skilled in the art.

End cap 820 may be releasably connected to stator 840A with threads, fasteners, bolts or any other method. Rotary shaft 802 may be connected to rotor 810 or may be a unitary body. Rotor 810 may have permanent magnets 814 mounted onto the outer surface of rotor disk 812. Power cable terminal 920 may receive power cable 62 and be attached to end cap 820. The power cable 62 may be attached to power cable terminal 920 by any mechanical connection method such as threading, bolting, welding, or cable connectors (not shown) that anchor and seal the power cable 62 to the power cable terminal 920 or any other means that provides mechanical stability. The power cable 62 may contain two, three, or more power conductors 926 connected to two, three, or more releasable pin connectors 922A. Although the power cable terminal 920, power cable 62, and releasable pin connectors 922A are illustrated as a separate assembly attached to the end cap 820, it is understood that the power cable terminal 920, power cable 62, and releasable pin connectors 922A may be integrated into the end cap 820 or configured radially about the circumference of the axial flux motor 800.

Stator 840A is connected to end cap 820 and stator 860 by threading, fasteners, other connecting parts (not shown), or a combination of any of those methods. The stator 840A has electromagnetic windings 842A wound radially about a stator core 844A. The stator core 844A may be slotted or non-slotted. The electromagnetic windings 842A may be wound with straight partial torus shape or with an angular partial torus shape. Power transfer terminal 940A may include two, three, or more releasable box connectors 944A connected to power conductors 946A that terminate at releasable pin connectors 942A. Two, three, or more stator conductor cables 948A may be connected to power conductors 946A. The stator conductor cables 948A are routed through the stator 840A to provide power and voltage to the electromagnetic windings 842A. The power conductors 946A and stator conductor cables 948A may be configured to connect the stator 840A in series with stator 860 and any other stator that may be connected. The power conductors 946A and stator conductor cables 948A may be configured to connect the stator 840A in parallel with stator 860 and any other stator that may be connected. The power conductors 946A and stator conductor cables 948A may be configured to connect the stator 840A in a hybrid series-parallel configuration with stator 860 and any other stator that may be connected. The power conductors 946A and stator conductor cables 948A may be configured with an addressable location that the controller 60 may control individually. The controller 60 may selectively power the stator on or off depending on the inputs and sensor array 70 statuses.

A rotor 830A may be connected to rotor 810 at rotor hub 818. Rotor 830A may have permanent magnets 834A mounted inside rotor disk 832A. Rotary shaft 836A may be connected to rotor disk 832A or may be a unitary construction. Rotary shaft 836A is connected to rotor disk 812 at rotor hub 818 by threaded connection, fasteners, other connecting parts (not shown) or a combination of methods.

A stator 860 may be connected to stator 840A and oil pump end sub 880 by threading, fasteners, other connecting parts (not shown), or a combination of any of those methods. The stator 860 may have electromagnetic windings 862 wound radially about a stator core 864. The stator core 864 may be slotted or non-slotted. The electromagnetic windings 862 may be wound with straight partial torus shape or with an angular partial torus shape. Power transfer terminal 960 may include two, three, or more releasable box connectors 964 connected to power conductors 966 that terminate at releasable pin connectors 962. Two, three, or more stator conductor cables 968 may be connected to power conductors 966. The stator conductor cables 968 are routed through the stator 860 to provide power and voltage to the electromagnetic windings 862. The power conductors 966 and stator conductor cables 968 may be configured to connect the stator 860 in series with stator 840A and any other stator that may be connected. The power conductors 966 and stator conductor cables 968 may be configured to connect the stator 860 in parallel with stator 840A and any other stator that may be connected. The power conductors 966 and stator conductor cables 968 may be configured to connect the stator 860 in a hybrid series-parallel configuration with stator 840A and any other stator that may be connected. The power conductors 966 and stator conductor cables 968 may be configured with an addressable location that the controller 60 may control individually. The controller 60 may selectively power the stator on or off depending on the inputs and sensor array 70 statuses.

A rotor 870 may be connected to rotor 830A at rotor hub 838A. Rotor 870 may have permanent magnets 874 mounted onto the surface or mounted inside rotor disk 872. Rotary shaft 876 may be connected to rotor disk 872 or may be a unitary construction. Rotary shaft 876 is connected to rotor disk 832A at rotor hub 838A by threaded connection, fasteners, other connecting parts (not shown) or a combination of methods.

Oil pump end sub 880 may be connected to the lower end of the stator 860. The oil pump may describe a pump formed by an impeller and diffuser, however any type of rotary pumping method may be utilized: external gear pump, internal gear pump, lobe pump, sliding vane pump, single screw pump, double screw pump, single stage centrifugal pump, or multistage centrifugal pump, or any similar pump type. Oil pump shaft 888 may be connected to rotor disk 872 at rotor disk hub 878 by threads, fasteners, connector parts (not shown), or a combination of methods. Power transfer terminal 980 may include two, three, or more releasable box connectors 984 that terminate or may be connected to power conductors (not shown) that are utilized to power addition equipment not shown; for example an additional oil pump.

The oil pump end sub 880 circulates oil through the axial flux motor 800 to lubricate and transfer heat away from internal bearings. The rotary shaft bearings 887 may be configured to support the rotors, reduce vibration, and distribute radial and axial loading. The rotary shaft bearings 887 may be fluid film, rolling element, or other type bearings such as rotationally sliding sleeve and bushing bearings, ball bearings, roller bearings, spherical roller, tapered roller, or needle roller. The rotary shaft bearings 887 may be housed inside an open assembly that allows lubricating fluid to flow through or a closed assembly with a sealed structure. The rotary shaft bearings 887 may be any of the listed configurations or any combination thereof. The rotary shaft bearings 447 may be constructed of bronze, steel alloy, nickel alloy, ceramics, graphite, composite materials, or any combination thereof.

Although the rotary shaft bearings 491 are shown in one location, the rotary shaft bearings 491 may be placed in multiple locations within the axial flux motor 800. The rotary shaft bearings 491 may be placed between front rotor 450 and back rotor 470. The rotary shaft bearing 491 may be placed adjacent to front surface and back surface of each rotor. Each of the rotary shaft bearings 491 placed in the axial flux motor 800 may be the same type of bearing or may be multiple types of bearings.

A heat exchanger 895 may be attached to the oil pump end sub 880. In an embodiment, the heat exchanger 895 may be a refrigeration assembly shown in FIG. 7D. In an embodiment, the heat exchanger 895 may be an oil reservoir 734 shown in FIG. 7D. In an embodiment, the heat exchanger 895 may be oil channels with an outer housing shown in FIG. 7C.

A method of modifying the torque capacity for an axial flux motor 800 attached to a pump assembly may be performed in the following manner. The oil pump end sub may be drained of oil and removed. A rotor may be decoupled from a mating rotor and removed. A stator may be decoupled from a mating stator and removed. Decoupling the stator also disconnects the electrical power connections by disconnecting the releasable pin connectors from the releasable box connectors. Multiple rotor and stator pairs may be decoupled and removed from the axial flux motor 800 that may be attached to a pump assembly.

The magnetic torque capacity may be decreased by removing one or more rotor and stator pairs and reassembling the remaining rotor and stators to the axial flux motor 800.

The torque capacity may be increased by adding one or more rotor and stator pairs while reassembling the disassembled rotor and stators to the axial flux motor 800.

The torque capacity of an embodiment of axial flux motor 800 may be increased by decoupling stator 840A and stator 860 by unthreading, removing fasteners, removing mating hardware (not shown) or a combination of methods. The rotor 870 may be decoupled from rotor 830A by unthreading, removing fasteners, removing mating hardware (not shown) from rotary shaft 876 and rotor hub 838A.

An assembly of stator 840B and rotor 830B may be added to axial flux motor 800.

Stator 840B may be coupled to stator 840A. Rotor 830B may be coupled to rotor 830A at rotor hub 838A. Stator 860 may be coupled to stator 840B. Rotor 870 may be coupled to rotor 830B at hub 838B. The oil pump end sub 880 may be connected to stator 860. The oil pump shaft 888 may be connected at rotor disk hub 878.

The torque capacity of an embodiment of axial flux motor 800 may be decreased utilizing the same method but removing a stator and rotor instead of adding a stator and rotor.

The axial flux motor configurations shown in FIGS. 7A-D and FIG. 8 may be used for axial flux motor 50 shown in FIG. 1.

The rotor and stator configurations shown in FIG. 2, FIG. 3, FIG. 4, FIG. 5, and FIG. 6 may be used inside the housing of axial flux motor shown in FIGS. 7A-D and FIG. 8.

In an aspect, disclosed herein is an electronic submersible pump (ESP) system, comprising an axial flux motor (for example and without limitation a modular axial flux motor comprising a plurality of rotor(s) and stator(s) assemblies/modules, for example has shown in FIG. 8); seal coupled to the axial flux motor; and a pump coupled to the seal. The ESP system can further comprise a pump a pump intake coupled to the pump; and a pump exit coupled to the pump. In an aspect, one or more components of the seal (including but not limited to a thrust bearing) and the axial flux motor are combined within a common housing, for example to form a sealed axial flux motor. In an aspect the ESP system is configured for a high temperature operating environment, for example a high bottomhole temperature (BHT) in a hydrocarbon producing wellbore such as in a range of from about 200° F. to about 500° F., alternatively from about 300° F. to about 500° F., or alternatively from about 400° F. to about 500° F.

In an aspect, disclosed herein is a submersible ESP system, comprising a submersible axial flux motor assembly compromising one or more modules (e.g., an assembly of rotor(s) and stator(s) as shown in FIG. 8) of an axial flux modular motor; a seal coupled to the submersible axial flux motor having rotationally connection of the shafts; a pump intake coupled to the seal having rotationally connection of the shafts; a pump intake coupled to the pump having rotationally connection of the shafts; and a pump exit coupled to the pump. In an aspect, one or more components of the seal (including but not limited to a thrust bearing) and the axial flux motor are combined within a common housing, for example to form a sealed axial flux motor. In an aspect the ESP system is configured for a high temperature operating environment, for example a high bottomhole temperature (BHT) in a hydrocarbon producing wellbore such as in a range of from about 200° F. to about 500° F., alternatively from about 300° F. to about 500° F., or alternatively from about 400° F. to about 500° F.

ADDITIONAL DISCLOSURE

The following is provided as additional disclosure for combinations of features and aspects of the present invention.

A first embodiment, which is an electric submersible pump (ESP) system, comprising a submersible axial flux motor assembly compromising a stator and a rotor disposed within a motor housing and having an axial gap between the stator and rotor, wherein the stator has a plurality of stator windings, wherein the rotor has a plurality of permanent magnets, and wherein the rotor has a rotary shaft, a seal section sealingly engaged with the rotary shaft, wherein the seal section is located i) in the motor housing or ii) in a seal section housing coupled to the motor housing, and a pump coupled to the seal section and rotationally connected to the rotary shaft.

A second embodiment, which is the ESP system of the first embodiment, wherein the permanent magnets are mounted onto the surface of a rotor disk or fixed into the rotor disk.

A third embodiment, which is the ESP system of the first or the second embodiment, wherein the stator windings are including, but are not limited to i) wound in a radial direction on a slotted core, ii) wound in the radial direction on a non-slotted core, iii) wound in the radial direction with a partial torus shape about a non-slotted core, iv) wound about a stator winding core mounted on a first surface of a stator core, or v) wound about a stator winding core mounted on a first and second surface of a stator core.

A fourth embodiment, which is the ESP system of any of the first through the third embodiments, wherein the pump is any type of fluid moving device including but not limited to one or more centrifugal pump(s), a gear pump(s), a screw pump(s), a double screw pump(s), or a progressing cavity pump(s).

A fifth embodiment, which is the ESP system of any of the first through the fourth embodiments, wherein the submersible axial flux motor assembly and a thrust bearing are disposed within a common housing.

A sixth embodiment, which is the ESP system of any of the first through the fifth embodiments, further comprises a pump intake coupled between the seal section and the pump and having rotational connection of the rotary shaft.

A seventh embodiment, which is the ESP system of the sixth embodiment, wherein the pump intake includes any of a sand separator, gas separator, or water separator.

An eighth embodiment, which is the ESP system of any of the first through the seventh embodiments, further comprising a pump exit coupled to the pump.

A ninth embodiment, which is the ESP system of any of the first through the eighth embodiments, wherein the pump includes, but not limited to, a production pump or an injection pump.

A tenth embodiment, which is an ESP system, comprising submersible axial flux motor assembly compromising two or more detachable motor modules of an axial flux motor coupled together, wherein each motor module includes at least one stator and one rotor having a rotary shaft, and the rotary shafts of the two or more modules rotationally coupled together, a seal section sealingly engaged with the axial flux motor assembly and coupled to the rotary shaft of a terminal module of the axial flux motor assembly, and a pump coupled to the seal section and rotationally connected to the rotary shaft.

An eleventh embodiment, which is the ESP system of the tenth embodiment, wherein a torque capacity of the axial flux motor assembly is increased by adding an additional motor module or decreased by removing an existing motor module.

A twelfth embodiment, which is the ESP system of the tenth or the eleventh embodiment, wherein (i) two or more of the motor modules are disposed within a common motor housing; (ii) two or more of the motor modules are disposed within separate module housings that are coupled together; or (iii) both (i) and (ii).

A thirteenth embodiment, which is the ESP system of any of the tenth through the twelfth embodiments, wherein the submersible axial flux motor assembly comprises a first motor module having a first module housing and a second motor module having a second module housing, wherein a second motor module housing is connected to a first motor module housing and a second rotary shaft of a second rotor is coupled with a first rotary shaft of a first rotor.

A fourteenth embodiment, which is the ESP system of any of the tenth through the thirteenth embodiments, wherein the seal section and the terminal module of the axial flux motor assembly are disposed within a common housing.

A fifteenth embodiment, which is the ESP system of any of the tenth through the fourteenth embodiments, wherein the axial flux motor modules are independently controlled.

A sixteenth embodiment, which is the ESP system of any of the tenth through the fifteenth embodiments, wherein each stator/rotor pair of each axial flux motor module are independently controlled.

A seventeenth embodiment, which is the ESP system of any of the tenth through the sixteenth embodiments, wherein each stator has a plurality of stator windings, wherein the stator windings are including, but not limited to i) wound in a radial direction on a slotted core, ii) wound in the radial direction on a non-slotted core, iii) wound in the radial direction with a partial torus shape about a non-slotted core, iv) wound about a stator winding core mounted on a first surface of a stator core, or v) wound about a stator winding core mounted on a first and second surface of a stator core.

An eighteenth embodiment, which is the ESP system of any of the tenth through the seventeenth embodiments, wherein a plurality of permanent magnets are mounted onto the surface of a rotor disk or fixed into the rotor disk.

A nineteenth embodiment, which is the ESP system of any of the tenth through the eighteenth embodiments, wherein the pump is any type of fluid moving device including but not limited to one or more centrifugal pump(s), gear pump(s), screw pump(s), double screw pump(s), or progressing cavity pump(s).

A twentieth embodiment, which is a method of modifying the torque capacity of an axial flux modular motor of an ESP system having two or more modules, the method comprising removing an end subassembly from the axial flux modular motor to access a first module of the axial flux modular motor, removing the first module of the axial flux modular motor, wherein the first module includes at least one rotor and one stator, wherein a housing of the first module is detached from the axial flux modular motor, wherein a rotary shaft of a first rotor is decoupled from the rotary shaft of the axial flux modular motor, and wherein a power transfer terminal of the first module is disconnected from the power transfer terminal of the axial flux modular motor, and installing a second module of an axial flux modular motor, wherein the second module includes at least one rotor and one stator, wherein a housing of the second module is attached to the axial flux modular motor, wherein a rotary shaft of a second rotor is coupled to the rotary shaft of the axial flux modular motor, wherein a power transfer terminal of the second module is connected to the power transfer terminal of the axial flux modular motor, whereby a torque capacity of the axial flux modular motor has changed from an original capacity to a modified capacity.

A twenty-first embodiment, which is the method of the twentieth embodiment, wherein the number, size, and/or configuration of rotors and stators in the first module is different than the number, size, and/or configuration of rotor and stators in the second module.

A twenty-second embodiment, which is the method of the twentieth or the twenty-first embodiment, wherein the second module has more torque capacity than the first module, whereby the torque capacity has increased.

A twenty-third embodiment, which is the method of the twentieth or the twenty-first embodiment, wherein the second module has less torque capacity than the first module, whereby the torque capacity has decreased.

A twenty-fourth embodiment, which is the method of any of the twentieth through the twenty-third embodiments, wherein the end subassembly is one of a base, an oil pump end, or a heat exchanger.

A twenty-fifth embodiment, which is the method of any of the twentieth through the twenty-fourth embodiments, wherein the axial flux motor remains connected to a pump, a seal section, or a combination thereof.

A twenty-sixth embodiment, which is the method of the twenty-fifth embodiment, wherein the pump is any type of fluid moving device including but not limited to a centrifugal pump, a gear pump, a screw pump, a double screw pump, or a progressing cavity pump.

A twenty-seventh embodiment, which is the method of the twenty-fifth or the twenty-sixth embodiment, wherein the axial flux motor is disconnected from the pump, the seal section, or a combination thereof.

While several embodiments have been provided in the present disclosure, it should be understood that the disclosed systems and methods may be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted or not implemented.

Also, techniques, systems, subsystems, and methods described and illustrated in the various embodiments as discrete or separate may be combined or integrated with other systems, modules, techniques, or methods without departing from the scope of the present disclosure. Other items shown or discussed as directly coupled or communicating with each other may be indirectly coupled or communicating through some interface, device, or intermediate component, whether electrically, mechanically, or otherwise. Other examples of changes, substitutions, and alterations are ascertainable by one skilled in the art and could be made without departing from the spirit and scope disclosed herein.

What is claimed is:

1. An ESP system, comprising:
a submersible axial flux motor assembly compromising two or more detachable motor modules of an axial flux motor coupled together, wherein the two or more detachable motor modules are disposed within a separate common motor housing, wherein the common motor housing is a unitary housing configured for the two or more motor modules to be jointly disposed therein and each of the two or more motor modules are separately removable from within the common motor housing, wherein each motor module includes at least one stator and one rotor having a rotary shaft, wherein at least one of the two or more motor modules comprises at least three rotors and at least two stators with an axial gap therebetween, and wherein the rotary shafts of the two or more motor modules are rotationally coupled together;
a seal section sealingly engaged with the axial flux motor assembly and coupled to the rotary shaft of a terminal module of the axial flux motor assembly; and
a pump coupled to the seal section and rotationally connected to the rotary shaft.

2. The ESP system of claim 1, wherein the stator has a plurality of stator windings and wherein the rotor has a plurality of permanent magnets.

3. The ESP system of claim 2, wherein the permanent magnets are mounted onto the surface of a rotor disk or fixed into the rotor disk.

4. The ESP system of claim 2, wherein the stator windings i) wound in a radial direction on a slotted core, ii) wound in the radial direction on a non-slotted core, iii) wound in the radial direction with a partial torus shape about a non-slotted core, iv) wound about a stator winding core mounted on a first surface of a stator core, or v) wound about a stator winding core mounted on a first and second surface of a stator core.

5. The ESP system of claim 2, wherein the submersible axial flux motor assembly and a thrust bearing are disposed within a common housing.

6. The ESP system of claim 2, further comprises a pump intake coupled between the seal section and the pump and having rotational connection of the rotary shaft.

7. The ESP system of claim 6, wherein the pump intake comprises a sand separator, gas separator, or water separator.

8. The ESP system of claim 1, wherein the common motor housing is configured for at least three motor modules to be disposed therein, and a torque capacity of the axial flux motor assembly is increased by adding an additional motor module or decreased by removing an existing motor module.

9. The ESP system of claim 1, wherein at least one motor module comprises at least two rotors and at least one stator disposed within a module housing with a placement sequence of a first rotor, a first stator, and a second rotor, and having an axial gap between each of the stators and the rotors.

10. The ESP system of claim 1, wherein the submersible axial flux motor assembly comprises a first motor module having a first module housing and a second motor module having a second module housing, wherein a second motor module housing is connected to a first motor module housing and a second rotary shaft of a second rotor is coupled with a first rotary shaft of a first rotor.

11. The ESP system of claim 1, wherein the seal section and a terminal motor module are disposed within a common end housing, and wherein the common end housing is configured to detachably couple to the common motor housing of the axial flux motor assembly.

12. The ESP system of claim 1, wherein the axial flux motor modules are independently controlled.

13. A method of modifying the torque capacity of an axial flux modular motor of an ESP system having two or more modules disposed within a common motor housing, the method comprising:
first, removing an end subassembly from the motor housing to access a first module of the two or more modules of the axial flux modular motor;
second, removing the first module of the axial flux modular motor from the motor housing, wherein the first module includes at least one rotor having a rotary shaft and one stator, wherein the rotary shaft of a first module is decoupled from a rotary shaft of the axial flux modular motor, and wherein a power transfer terminal of the first module is disconnected from a power transfer terminal of the axial flux modular motor; and
third, installing a second module of an axial flux modular motor in the motor housing, wherein the second module includes at least one rotor having a rotary shaft and one stator, wherein the rotary shaft of a second module is coupled to the rotary shaft of the axial flux modular motor, wherein a power transfer terminal of the second module is connected to the power transfer terminal of the axial flux modular motor;
wherein the first module, the second module or both comprise at least two rotors and at least one stator or at least two stators and at least one rotor, with an axial gap therebetween;
whereby a torque capacity of the axial flux modular motor has changed from an original capacity to a modified capacity; and
wherein the axial flux motor remains connected to a pump, a seal section, or a combination thereof during the modifying of the torque capacity of an axial flux modular motor.

14. The method of claim 13, wherein the number, size, and/or configuration of rotors and stators in the first module is different than the number, size, and/or configuration of rotor and stators in the second module.

15. The method of claim 13, wherein the second module has more torque capacity than the first module, whereby the torque capacity has increased.

16. The method of claim 13, wherein the second module has less torque capacity than the first module, whereby the torque capacity has decreased.

17. The method of claim 13, wherein the end subassembly comprises one of an oil pump end or a heat exchanger.

18. The method of claim 13, wherein the common motor housing is a unitary housing configured for the two or more motor modules to be jointly disposed therein.

19. The method of claim 18, wherein the pump is a centrifugal pump, a gear pump, a screw pump, a double screw pump, or a progressing cavity pump.

20. The method of claim 18, wherein each of the two or more modules are separately removable from within the common motor housing.

21. The ESP system of claim 1, wherein the at least one of the two or more motor modules comprises the at least three rotors and the at least two stators disposed within a module housing with an axial placement sequence of a first rotor, a first stator, a second rotor, a second stator, and a third rotor, and having an axial gap between each of the stators and the rotors.

22. The ESP system of claim 1, wherein the at least one of the two motor modules comprises at least four rotors and at least three stators disposed within a module housing with an axial placement sequence of a first rotor, a first stator, a second rotor, a second stator, a third rotor, a third stator, and a fourth rotor, and having an axial gap between each of the stators and the rotors.

23. The methodESP system of claim 13, wherein the first module, the second module or both comprise at least two rotors and at least one stator disposed within a module housing with an axial placement sequence of a first rotor, a first stator, and a second rotor, and having an axial gap between each of the stators and the rotors.

24. The method of claim 13, wherein the first module, the second module or both comprise at least three rotors and at least two stators disposed within a module housing with an axial placement sequence of a first rotor, a first stator, a second rotor, a second stator, and a third rotor, and having an axial gap between each of the stators and the rotors.

25. The method of claim 13, wherein the first module, the second module, or both comprise at least four rotors and at least three stators disposed within a module housing with an axial placement sequence of a first rotor, a first stator, a second rotor, a second stator, a third rotor, a third stator, and a fourth rotor, and having an axial gap between each of the stators and the rotors.

* * * * *

UNITED STATES PATENT AND TRADEMARK OFFICE
CERTIFICATE OF CORRECTION

PATENT NO. : 11,916,450 B2
APPLICATION NO. : 17/196223
DATED : February 27, 2024
INVENTOR(S) : Ketankumar Kantilal Sheth et al.

It is certified that error appears in the above-identified patent and that said Letters Patent is hereby corrected as shown below:

In the Claims

In Column 26, Line 34: Replace "methodESP system" with --method--

Signed and Sealed this
Twenty-third Day of April, 2024

Katherine Kelly Vidal
Director of the United States Patent and Trademark Office